United States Patent
Li et al.

(10) Patent No.: US 9,715,721 B2
(45) Date of Patent: Jul. 25, 2017

(54) FOCUS DETECTION

(71) Applicant: Sony Corporation, Tokyo (JP)

(72) Inventors: Pingshan Li, Sunnyvale, CA (US); Jianing Wei, Cupertino, CA (US); Xue Tu, Fremont, CA (US); Alexander Berestov, San Jose, CA (US); Takami Mizukura, Kanagawa (JP); Akira Matsui, Kanagawa (JP); Tomonori Shuda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/975,315

(22) Filed: Dec. 18, 2015

(65) Prior Publication Data

US 2017/0178296 A1    Jun. 22, 2017

(51) Int. Cl.
  *G06K 9/00*  (2006.01)
  *G06T 5/00*  (2006.01)
  *H04N 5/232* (2006.01)
  *G03B 13/36* (2006.01)

(52) U.S. Cl.
  CPC ............ *G06T 5/003* (2013.01); *G03B 13/36* (2013.01); *H04N 5/23212* (2013.01); *G06T 2207/30168* (2013.01)

(58) Field of Classification Search
  CPC .......... G06T 5/003; G06T 2207/20064; G06T 2207/20201; G06T 2207/30168; G06T 5/001; H04N 5/23212
  See application file for complete search history.

(56) References Cited

U.S. PATENT DOCUMENTS

| | | | |
|---|---|---|---|
| 5,475,429 A * | 12/1995 | Kodama | H04N 5/23212 348/350 |
| 6,215,892 B1 | 4/2001 | Douglass et al. | |
| 6,753,919 B1 * | 6/2004 | Daugman | G06K 9/00597 348/345 |
| 6,970,789 B2 | 11/2005 | Ippolito et al. | |

(Continued)

FOREIGN PATENT DOCUMENTS

EP    2498504 A1    7/2007

OTHER PUBLICATIONS

Yap, Pew Thian, and P. Raveendran. "Image focus measure based on Chebyshev moments." IEE Proceedings-Vision, Image and Signal Processing 151.2 (2004): 128-136.*

(Continued)

*Primary Examiner* — Li Liu
(74) *Attorney, Agent, or Firm* — Haverstock & Owens LLP

(57) ABSTRACT

Focus detection is to determine whether an image is in focus or not. Focus detection is able to be used for improving camera autofocus performance. Focus detection by using only one feature does not provide enough reliability to distinguish in-focus and slightly out-of-focus images. A focus detection algorithm of combining multiple features used to evaluate sharpness is described herein. A large image data set with in-focus and out-of-focus images is used to develop the focus detector for separating the in-focus images from out-of-focus images. Many features such as iterative blur estimation, FFT linearity, edge percentage, wavelet energy ratio, improved wavelet energy ratio, Chebyshev moment ratio and chromatic aberration features are able to be used to evaluate sharpness and determine big blur images.

22 Claims, 22 Drawing Sheets

(56) References Cited

U.S. PATENT DOCUMENTS

| | | | |
|---|---|---|---|
| 8,212,889 B2 | 7/2012 | Chanas et al. | |
| 8,340,456 B1 | 12/2012 | DaneshPanah et al. | |
| 8,588,503 B2* | 11/2013 | Adiga | G06T 7/0012 382/133 |
| 8,922,662 B1* | 12/2014 | Fu | H04N 5/23264 348/208.12 |
| 9,357,123 B1* | 5/2016 | Schiller | G06T 7/0059 |
| 2002/0145106 A1* | 10/2002 | Chen | G06T 7/0085 250/208.1 |
| 2004/0066981 A1* | 4/2004 | Li | G06T 7/0083 382/286 |
| 2004/0120598 A1* | 6/2004 | Feng | G06T 5/10 382/263 |
| 2005/0231603 A1* | 10/2005 | Poon | G06T 5/004 348/208.99 |
| 2007/0165961 A1* | 7/2007 | Lu | G06T 5/50 382/254 |
| 2010/0232685 A1* | 9/2010 | Yokokawa | H04N 5/142 382/159 |
| 2011/0032413 A1* | 2/2011 | Kulkarni | G03B 13/36 348/351 |
| 2011/0199532 A1 | 8/2011 | Jin | |
| 2012/0106937 A1 | 5/2012 | Molin et al. | |
| 2012/0127360 A1 | 5/2012 | Devaux et al. | |
| 2012/0155735 A1 | 6/2012 | Friedman et al. | |
| 2012/0236120 A1* | 9/2012 | Kramer | G02B 21/0004 348/46 |
| 2012/0243792 A1 | 9/2012 | Kostyukov et al. | |
| 2013/0063566 A1* | 3/2013 | Morgan-Mar | G06T 7/0069 348/46 |
| 2013/0066597 A1 | 3/2013 | Van Beurden | |
| 2013/0266210 A1 | 10/2013 | Morgan-Mar et al. | |
| 2014/0222749 A1 | 8/2014 | Fernandez Martinez | |
| 2015/0003712 A1 | 1/2015 | Lang et al. | |
| 2016/0295098 A1* | 10/2016 | Li | G06T 7/0069 |
| 2016/0360090 A1* | 12/2016 | Kleyman | H04N 5/23212 |

OTHER PUBLICATIONS

Tong, Hanghang, et al. "Blur detection for digital images using wavelet transform." Multimedia and Expo, 2004. ICME'04. 2004 IEEE International Conference on. vol. 1. IEEE, 2004.*

Zhang, Xi, et al. "Surface roughness measurement for castings based on wavelet energy." Multimedia Technology (ICMT), 2011 International Conference on. IEEE, 2011.*

Yao, Yi, et al. "Evaluation of sharpness measures and search algorithms for the auto focusing of high-magnification images." Defense and Security Symposium. International Society for Optics and Photonics, 2006.*

Kautsky, Jaroslav, et al. "A new wavelet-based measure of image focus." Pattern Recognition Letters 23.14 (2002): 1785-1794.*

Subbarao, Muralidhara, and J-K. Tyan. "Selecting the optimal focus measure for autofocusing and depth-from-focus." IEEE transactions on pattern analysis and machine intelligence 20.8 (1998): 864-870.*

Groen et al., "A Comparison of Different Focus Functions for Use in Autofocus Algorithms", Alan R. Liss, Inc., Cytometry, pp. 6:81-91 (1985), Department of Applied Physics, Delft University of Technology, 2600 GA Delft, The Netherlands.

Maria Rudnaya, "Automated Focusing and Astigmatism Correction in Electron Microscopy".

Kautsky et al., "A New Wavelet-Based Measure of Image Focus" Pattern Recognition Letters 23, pp. 1785-1794, (2002), Department of Mathematics and Statistics, Flinders University of South Australia, GPO Box 2100, Adelaide, SA 5001, Australia, Institute of Information Theory and Automation, Academy of Sciences of the Czech Republic, Pod vodarensku vezi 4, 18208 Prague 8, Czech Republic, Astronomical Institute, Academy of Sciences of the Czech Republic, 25165 Ordrejou, Czech Republic.

Vu et al. "A Fast Wavelet-Based Algorithm for Global and Local Image Sharpness Estimation", 2012, IEEE.

International Search Report and Written Opinion from PCT/US16/66113.

* cited by examiner

M=N=50
Order:
m=n=2

M=N=50
Order:
m=n=10

FOCUS DETECTION

FIELD OF THE INVENTION

The present invention relates to the field of imaging. More specifically, the present invention relates to focus detection.

BACKGROUND OF THE INVENTION

In digital imaging, there are many ways of focusing on an object. However, the implementations have drawbacks and are able to be improved.

SUMMARY OF THE INVENTION

Focus detection is to determine whether an image is in focus or not. Focus detection is able to be used for improving camera autofocus performance. Focus detection by using only one feature does not provide enough reliability to distinguish in-focus and slightly out-of-focus images. A focus detection algorithm of combining multiple features used to evaluate sharpness is described herein. A large image data set with in-focus and out-of-focus images is used to develop the focus detector for separating the in-focus images from out-of-focus images. Many features such as iterative blur estimation, FFT linearity, edge percentage, wavelet energy ratio, improved wavelet energy ratio, Chebyshev moment ratio and chromatic aberration features are able to be used to evaluate sharpness and determine big blur images.

In one aspect, a method programmed in a non-transitory memory of a device comprises acquiring content, wherein the content includes one or more images, determining if the content includes big blur images, removing the big blur images and determining in-focus images of the remaining small blur images. The big blur images are far from the in-focus position such that the big blur images are at least 10 depth of field away. The big blur images are determined using criteria selected from iterative blur estimation, FFT linearity, edge percentage, wavelet energy ratio, improved wavelet energy ratio, Chebyshev moment ratio and chromatic aberration features. Determining if the content includes the big blur images includes utilizing chromatic aberration features including computing a wavelet energy ratio for a first channel of the one or more images, computing a wavelet energy ratio for a second channel of the one or more images, computing a difference of wavelet energy ratios and comparing the difference with a threshold. If the difference is below the threshold, then the one or more images are in focus. Determining if the content includes the big blur images includes computing a fast fourier transform of an area, computing a radial average of a magnitude of the fast fourier transform coefficients around frequency 0, computing a logarithm of magnitude and frequency, computing a linear regression, calculating an error between the linear regression result and the fast fourier transform coefficient curve for measuring linearity and combining the linearity error with a slope of the linear regression for focus detection. Determining if the content includes the big blur images includes computing a Chebyshev moment ratio. Determining the in-focus images of the remaining small blur images utilizes thresholds set for iteration number difference, combined chromatic features and combined non-chromatic features. The device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.

In another aspect, a system programmed in a non-transitory memory of a camera device comprises a sensor configured for capturing content from a scene, wherein the content includes one or more images and a computing module configured for: determining if the content includes big blur images, removing the big blur images and determining in-focus images of the remaining small blur images. The big blur images are far from the in-focus position such that the big blur images are at least 10 depth of field away. The big blur images are determined using criteria selected from iterative blur estimation, FFT linearity, edge percentage, wavelet energy ratio, improved wavelet energy ratio, Chebyshev moment ratio and chromatic aberration features. Determining if the content includes the big blur images includes utilizing chromatic aberration features including computing a wavelet energy ratio for a first channel of the one or more images, computing a wavelet energy ratio for a second channel of the one or more images, computing a difference of wavelet energy ratios and comparing the difference with a threshold. If the difference is below the threshold, then the one or more images are in focus. Determining if the content includes the big blur images includes computing a fast fourier transform of an area, computing a radial average of a magnitude of the fast fourier transform coefficients around frequency 0, computing a logarithm of magnitude and frequency, computing a linear regression, calculating an error between the linear regression result and the fast fourier transform coefficient curve for measuring linearity and combining the linearity error with a slope of the linear regression for focus detection. Determining if the content includes the big blur images includes computing a Chebyshev moment ratio. Determining the in-focus images of the remaining small blur images utilizes thresholds set for iteration number difference, combined chromatic features and combined non-chromatic features.

In another aspect, a camera device comprises a sensor for capturing content from a scene, wherein the content includes one or more images and a memory for storing an application, the application for: determining if the content includes big blur images, removing the big blur images and determining in-focus images of the remaining small blur images and a processor for processing the application. The big blur images are far from the in-focus position such that the big blur images are at least 10 depth of field away. The big blur images are determined using criteria selected from iterative blur estimation, FFT linearity, edge percentage, wavelet energy ratio, improved wavelet energy ratio, Chebyshev moment ratio and chromatic aberration features. Determining if the content includes the big blur images includes utilizing chromatic aberration features including computing a wavelet energy ratio for a first channel of the one or more images, computing a wavelet energy ratio for a second channel of the one or more images, computing a difference of wavelet energy ratios and comparing the difference with a threshold. If the difference is below the threshold, then the one or more images are in focus. Determining if the content includes the big blur images includes computing a fast fourier transform of an area, computing a radial average of a magnitude of the fast fourier transform coefficients around frequency 0, computing a logarithm of magnitude and frequency, computing a linear regression, calculating an error between the linear regression result and the fast fourier transform coefficient curve for measuring linearity and combining the linearity error with a slope of the linear regression for focus detection. Determining if the content includes the big blur images includes computing a Chebyshev moment ratio. Determining the in-focus images of the remaining small blur images utilizes thresholds set for iteration number difference, combined chromatic features and combined non-chromatic features.

In another aspect, a method programmed in a non-transitory memory of a device comprises acquiring a sequence of images using the device and generating a depth map using the sequence of images using a Chebyshev moment ratio. Each image of the sequence of images is taken with a different lens setting. Each image of the sequence of images is separated into small blocks and represent each block's depth by focus lens position. The Chebyshev moment ratio is used as a focus measure to find a sharpest image among the sequence of images. Generating the depth map includes generating a low resolution smooth depth map first, and then refining the low resolution smooth depth map to a high resolution depth map level by level, wherein in a coarse level, a block size is large enough to contain texture to ensure validity of the Chebyshev moment ratio, and a big image block is continuously split into smaller blocks until an object in each block is of a same depth. The method further comprises checking a curve shape of the Chebyshev moment ratio of the sequence of images, and if the Chebyshev moment ratio curve has multiple local maximum values, and all local maxima are large such that none stand out, then determining that a focused image found by comparing the Chebyshev moment ratio is not reliable, and if the Chebyshev moment ratio for an image patch is decided invalid, then a result from a lower level is used to replace the unreliable result.

DETAILED DESCRIPTION OF THE PREFERRED EMBODIMENT

Focus detection is to determine whether an image is in focus or not. Focus detection is able to be used for improving camera autofocus performance. Focus detection by using only one feature does not provide enough reliability to distinguish in-focus and slightly out-of-focus images. A focus detection algorithm of combining multiple features used to evaluate sharpness is described herein. A large image data set with in-focus and out-of-focus images is used to develop the focus detector for separating the in-focus images from out-of-focus images.

The training method for focus detection includes collecting image samples of in-focus and out-of-focus images, removing "big blur" images by thresholding on the value of each feature output, and the second step detects in-focus images from the remaining "small blur" images.

"Big blur" images are those that are far from the in-focus position (e.g., 10 Depth of Field (DOF) away). The purpose of detecting big blur is to remove them so that the remaining "small blur" images follow the statistical models.

Figure 1:
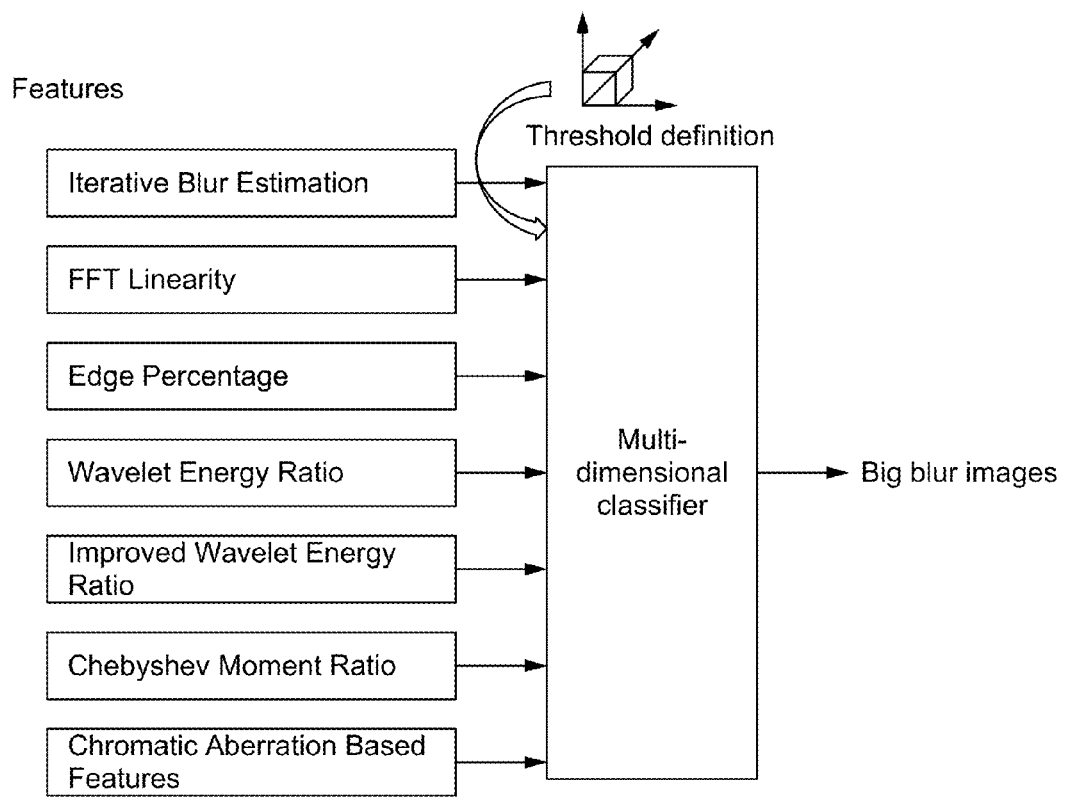
FIG. 1 illustrates a diagram of determining big blur images according to some embodiments.

FIG. 1 illustrates a diagram of determining big blur images according to some embodiments. Many features such as iterative blur estimation, described in U.S. patent application Ser. No. 14/832,781, filed Aug. 21, 2015 and titled, "Defocus Estimation for Single Image Based on Laplacian of Gaussian Approximation," which is hereby incorporated by reference in its entirety, FFT linearity, edge percentage, wavelet energy ratio, improved wavelet energy ratio, Chebyshev moment ratio and chromatic aberration features are able to be used to evaluate sharpness and determine big blur images.

Figure 2:
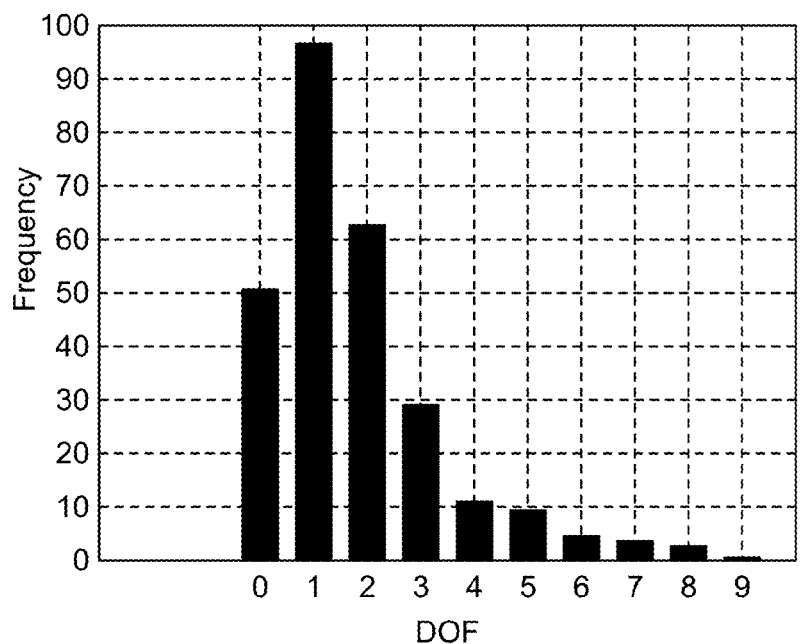
FIG. 2 illustrates a chart of small blur images and their frequency versus DOF according to some embodiments.
Figure 3:
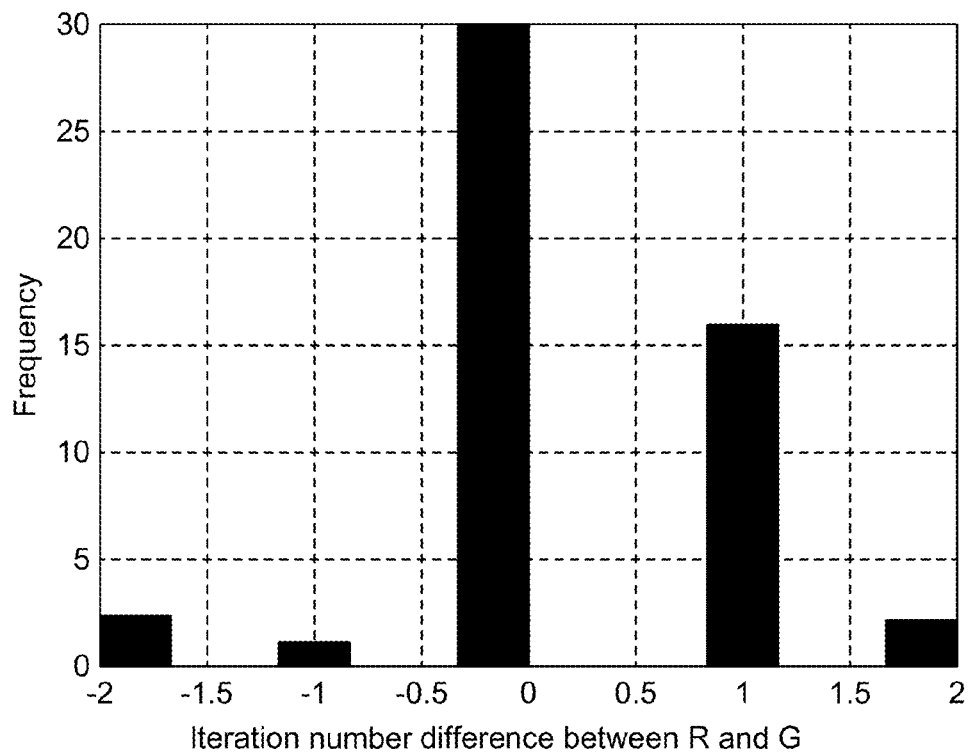
FIG. 3 illustrates a chart of using iterative convolution and chromatic aberration according to some embodiments.

FIG. 2 illustrates a chart of small blur images and their frequency versus DOF according to some embodiments. FIG. 3 illustrates a chart of using iterative convolution and chromatic aberration according to some embodiments. Most difference values between R and G are 0 and 1.

In a statistical model, a small blur image set is defined for each value (0 and 1) of iteration number difference. For each defined image set, a multivariate Gaussian model with 5 chromatic aberration features is built: spectrum linearity, spectrum slope, wavelet energy ratio, local contrast and wavelet-based chromatic aberration.

Mean and Covariance Matrices $$X \sim N(\mu_c, \underset{c}{\Sigma})$$

$$\mu_c = \begin{bmatrix} \mu_1 \\ \mu_2 \\ \mu_3 \\ \mu_4 \\ \mu_5 \end{bmatrix}$$

$$\underset{c}{\Sigma} = \begin{bmatrix} \sigma_1^2 & \rho_{1,2}\sigma_2\sigma_2 & \rho_{1,3}\sigma_1\sigma_3 & \rho_{1,4}\sigma_1\sigma_4 & \rho_{1,5}\sigma_1\sigma_5 \\ \rho_{2,1}\sigma_2\sigma_1 & \sigma_2^2 & \rho_{2,3}\sigma_2\sigma_3 & \rho_{2,4}\sigma_2\sigma_4 & \rho_{2,5}\sigma_2\sigma_5 \\ \rho_{3,1}\sigma_3\sigma_1 & \rho_{3,2}\sigma_3\sigma_2 & \sigma_3^2 & \rho_{3,4}\sigma_3\sigma_4 & \rho_{3,5}\sigma_{13}\sigma_5 \\ \rho_{4,1}\sigma_4\sigma_1 & \rho_{4,2}\sigma_4\sigma_2 & \rho_{4,3}\sigma_4\sigma_3 & \sigma_4^2 & \rho_{4,5}\sigma_4\sigma_5 \\ \rho_{5,1}\sigma_5\sigma_1 & \rho_{5,2}\sigma_5\sigma_2 & \rho_{5,3}\sigma_5\sigma_3 & \rho_{5,4}\sigma_5\sigma_4 & \sigma_5^2 \end{bmatrix}$$

5 Dimensional Multivariate Gaussian Distribution $$\mu_c = \begin{bmatrix} 0.0489 \\ -1.0833 \\ 0.2674 \\ -0.0306 \\ 0.0090 \end{bmatrix}$$

$$\underset{c}{\Sigma} = \begin{bmatrix} 0.0023 & -0.0032 & 0.0232 & -0.00006 & 0.0006 \\ -0.0032 & 0.0094 & -0.0767 & 0.0015 & -0.0015 \\ 0.0232 & -0.0767 & 0.9061 & -0.0143 & 0.0109 \\ -0.0006 & 0.0015 & -0.0144 & 0.0005 & -0.0002 \\ 0.0006 & -0.0015 & 0.0109 & -0.0002 & 0.0011 \end{bmatrix}$$

For in-focus images with iteration number difference=0

$$\mu_c = \begin{bmatrix} 0.0720 \\ -0.0161 \\ 1.4623 \\ -0.0407 \\ 0.0121 \end{bmatrix}$$

$$\underset{c}{\Sigma} = \begin{bmatrix} 0.0017 & -0.0023 & 0.0347 & -0.0004 & 0.0003 \\ -0.0023 & 0.0048 & -0.0734 & 0.0008 & -0.0005 \\ 0.0347 & -0.0734 & 1.8651 & -0.0143 & 0.0078 \\ -0.0004 & 0.0008 & -0.0143 & 0.0003 & -0.0001 \\ 0.0003 & -0.0005 & 0.0078 & -0.0001 & 0.0002 \end{bmatrix}$$

For in-focus images with iteration number difference=1

Multivariate Gaussian Model

Figure 4:
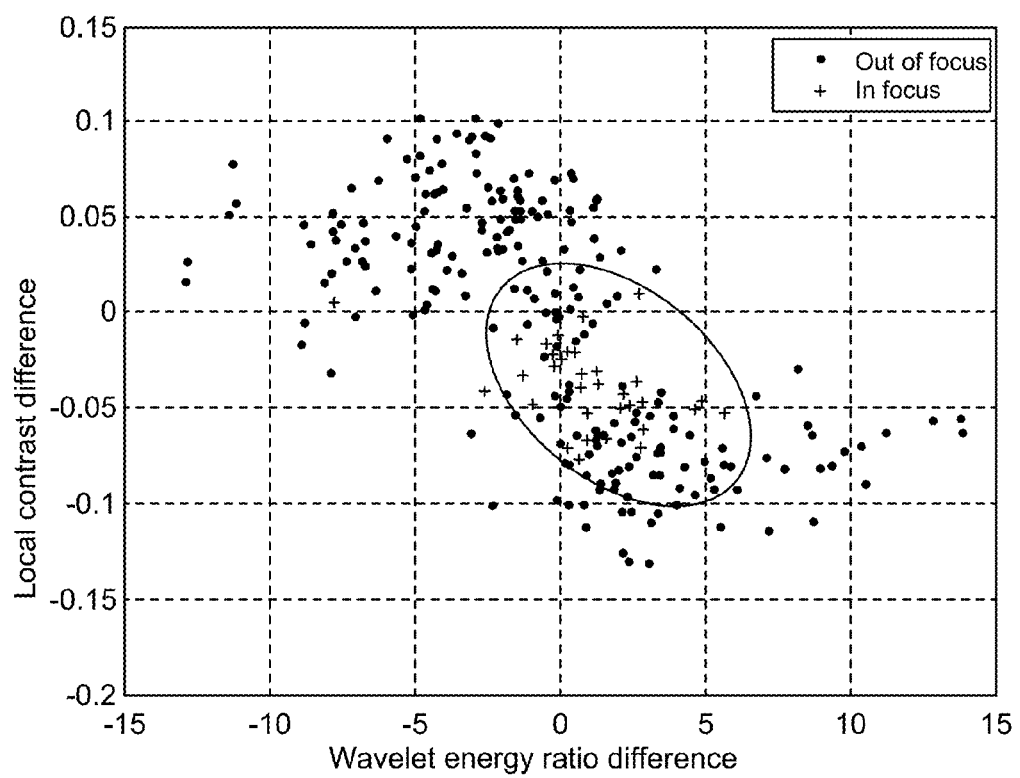
FIG. 4 illustrates a chart of in-focus image samples from multiple dimension features with chromatic aberration modeled using multivariate Gaussian distribution according to some embodiments.

Gaussian Distribution:

$$f(X) = \frac{1}{\sqrt{|2\pi\Sigma|}} \exp\left[-\frac{1}{2}c(X)\right]$$

where $c(X) = (X-\mu)^T \Sigma^{-1} (X-\mu)$ c(X) measures the distance to the center of the Gaussian distribution and is able to be used as the combined chromatic feature. At the same ellipse, c(X) has a constant value. At a smaller ellipse, c(X) is smaller. FIG. 4 illustrates a chart of in-focus image samples from multiple dimension features with chromatic aberration modeled using multivariate Gaussian distribution according to some embodiments.

Non-Chromatic Features

Figure 5:
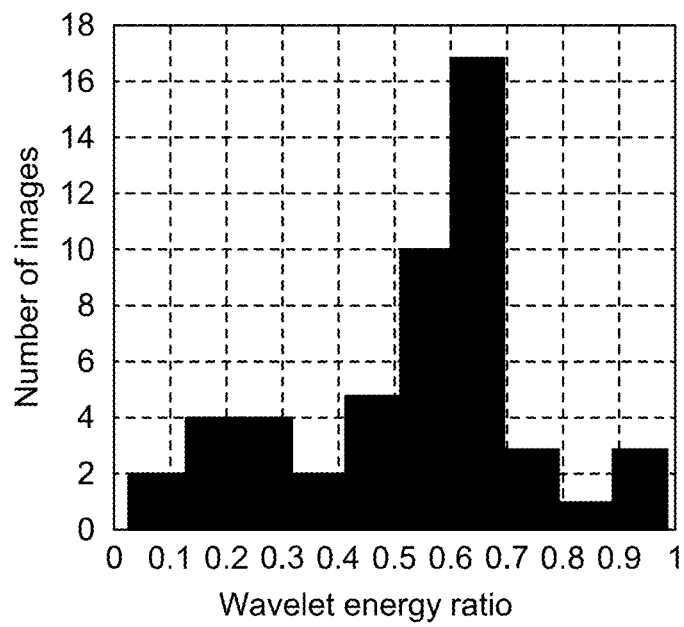
FIG. 5 illustrates a chart of the frequency of images versus wavelet energy ratio according to some embodiments.

The in-focus images for each of the following features is able to be modeled using Gaussian distribution: spectrum linearity, spectrum slope, energy percentage and wavelet energy ratio. Except for spectrum linearity, signs of the features are flipped so that a smaller value means closer to in-focus. FIG. 5 illustrates a chart of the frequency of images versus wavelet energy ratio according to some embodiments.

Linear Combination of Non-Chromatic Features $$y = \sum_i \frac{(x_i - \mu_i)}{\sigma_i}$$

$$\mu_n = \begin{bmatrix} \mu_1 \\ \mu_2 \\ \mu_3 \\ \mu_4 \end{bmatrix} \quad \underset{n}{\Sigma} = \begin{bmatrix} \sigma_1^2 \\ \sigma_2^2 \\ \sigma_3^2 \\ \sigma_4^2 \end{bmatrix}$$

$$\mu_n = \begin{bmatrix} 0.51148 \\ 2.1855 \\ -0.5636 \\ -0.5970 \end{bmatrix} \quad \underset{n}{\Sigma} = \begin{bmatrix} 0.0074 \\ 0.1173 \\ 0.0102 \\ 0.0049 \end{bmatrix}$$

For in-focus images with iteration number difference=0

$$\mu_n = \begin{bmatrix} 0.6775 \\ 2.8793 \\ -0.5930 \\ -0.5781 \end{bmatrix} \quad \underset{n}{\Sigma} = \begin{bmatrix} 0.0176 \\ 0.0960 \\ 0.0126 \\ 0.0555 \end{bmatrix}$$

For in-focus images with iteration number difference=1

Thresholds are set for iteration number difference, combined chromatic features and combined non-chromatic features.

Method of Single Picture Camera Focus Detection Using Chromatic Aberration

In digital cameras, during auto focus, it is often critical to assess whether the subject in the focus window is in focus. Typically multiple images are taken at different lens positions to determine whether the subject is in focus by comparing the sharpness or contrast among these images. Described herein, the focus is able to be determined from a single image. The amount of chromatic aberration inherent in every lens in any digital camera is used to decide whether the subject is in focus.

A sharpness measure based on the energy in each wavelet sub-band of the image is determined. The sharpness for each of the three color channels (red, green and blue) is computed. Due to chromatic aberration, the sharpness of red, green and blue channels are different on either side of the focus plane. For example, red channel is always sharper than the green channel on one side of the focus plane, but blurrier on the other side. But at the focus plane, the sharpness difference between different channels is minimal. By computing the difference in sharpness between color channels, it is possible to distinguish focused images and defocused images.

The blur/sharpness metrics vary significantly with image content or edge types. But, the variation of the difference between two color channels is much less. This is because there is strong correlation between color channels. For example, if the red channel is a step edge, then the green channel is most likely also a step edge. If the red channel is a texture, then the green channel is most likely also a texture. Although the blur metric of a step edge and texture image are able to be much different, the difference of the blur metric between the red and green channels of a step edge and texture image should not be much different.

Figure 6:
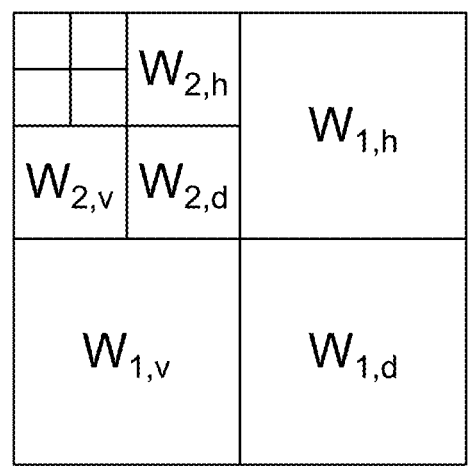
FIG. 6 illustrates a diagram of a block for wavelet transform calculations according to some embodiments.

An input image is acquired, and its L level wavelet transform W is computed. $W_{l,h}(i,j)$ is used to denote the horizontal band wavelet coefficients at level l, pixel location (i,j). Similarly, $W_{l,v}(i,j)$ is used to denote the vertical band wavelet coefficients and $W_{l,d}(i,j)$ is used to denote the diagonal band wavelet coefficients. Also, l=1 is used to denote the finest level, and l=L is used to denote the coarsest level. The following wavelet energy ratio is computed:

$$s = \frac{\sum_{l=1}^{L}\sum_{(i,j)}(W_{l,h}(i,j)^2 + W_{l,v}(i,j)^2 + W_{l,d}(i,j)^2)}{\sum_{(i,j)}(W_{l,h}(i,j)^2 + W_{l,v}(i,j)^2 + W_{l,d}(i,j)^2)}$$

where s is the sharpness/blur measure. A smaller s means a sharper image or closer to focus position. The wavelet energy ratio is the ratio between the sum of energy of all wavelet detail coefficients and the sum of energy of the finest level wavelet detail coefficients. At the in focus position, energy in high frequency bands (finest level) carry a large percentage. However, at out of focus positions, energies in high frequency bands only carry a small percentage. FIG. 6 illustrates a diagram of a block for wavelet transform calculations according to some embodiments.

Figure 7:
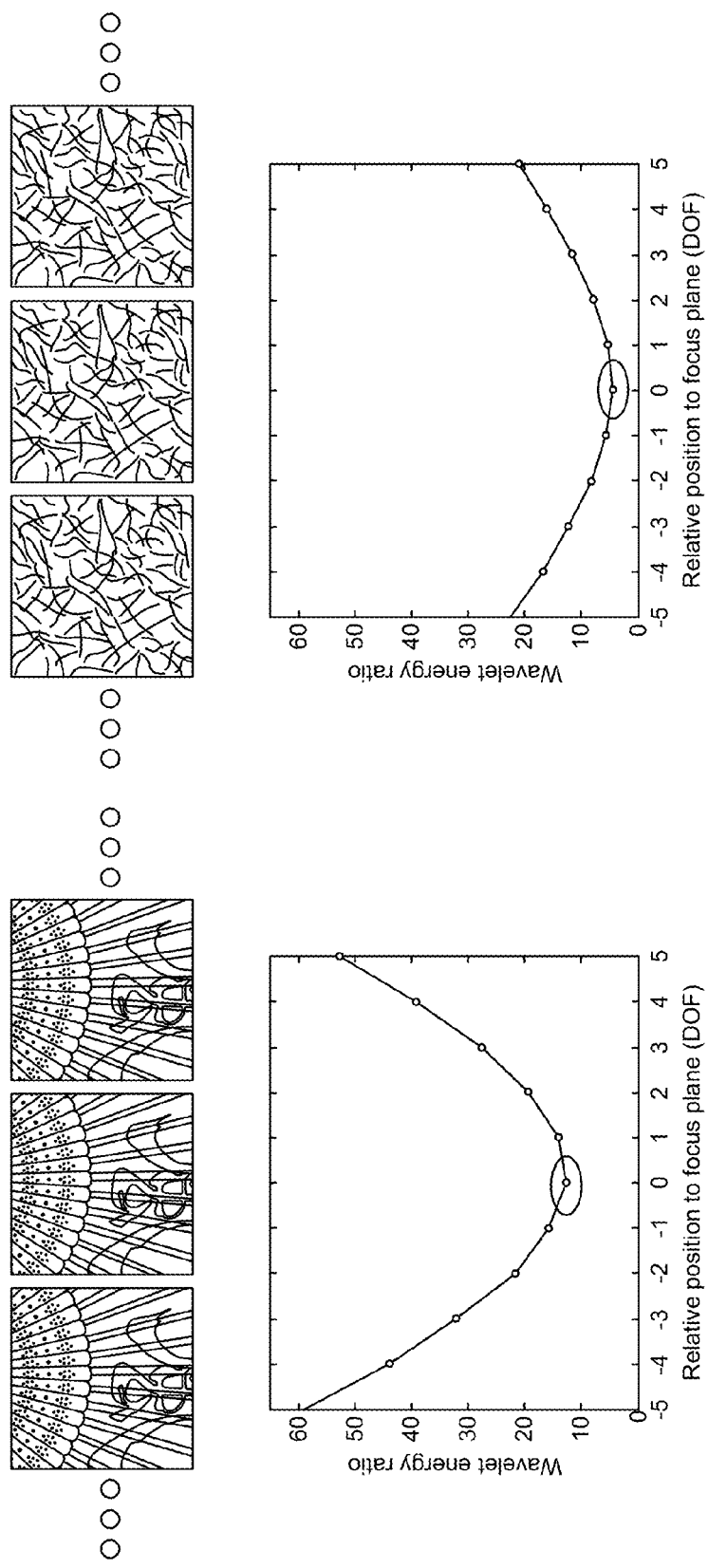
FIG. 7 illustrates an example of an application of the wavelet energy ratio according to some embodiments.

FIG. 7 illustrates an example of an application of the wavelet energy ratio according to some embodiments. As is able to be seen, the sharpness values at in focus position are very different for the images.

Figure 8:
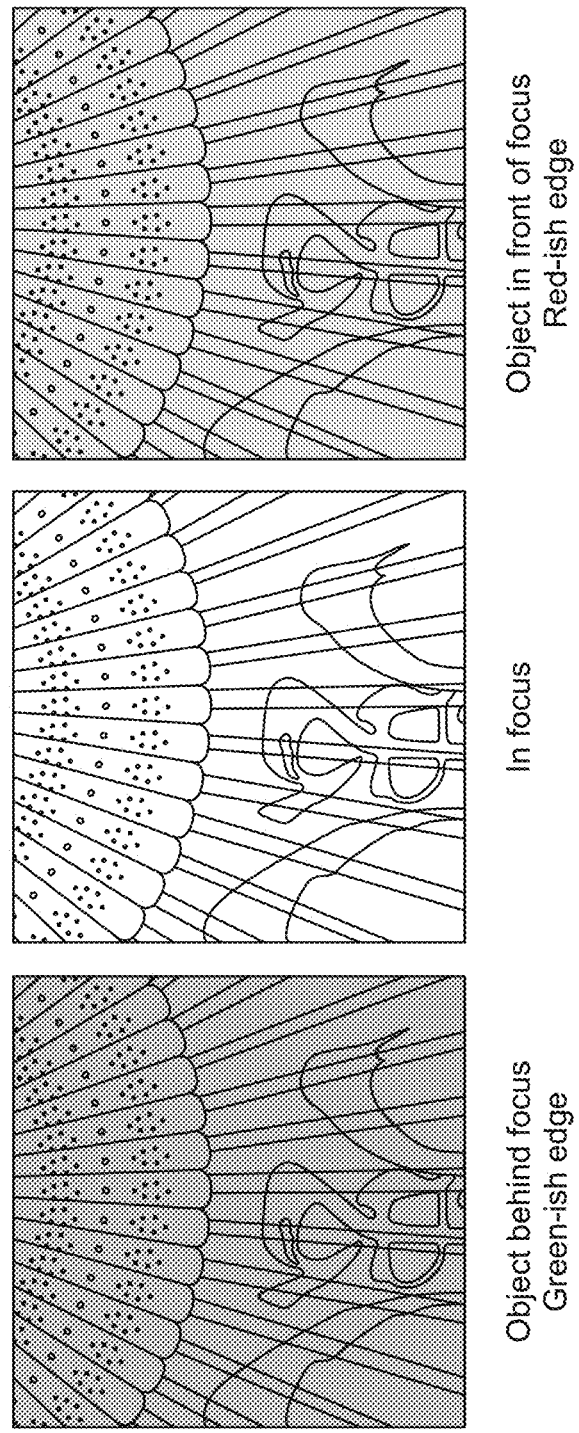
FIG. 8 illustrates an example of chromatic aberration according to some embodiments.
Figure 9:
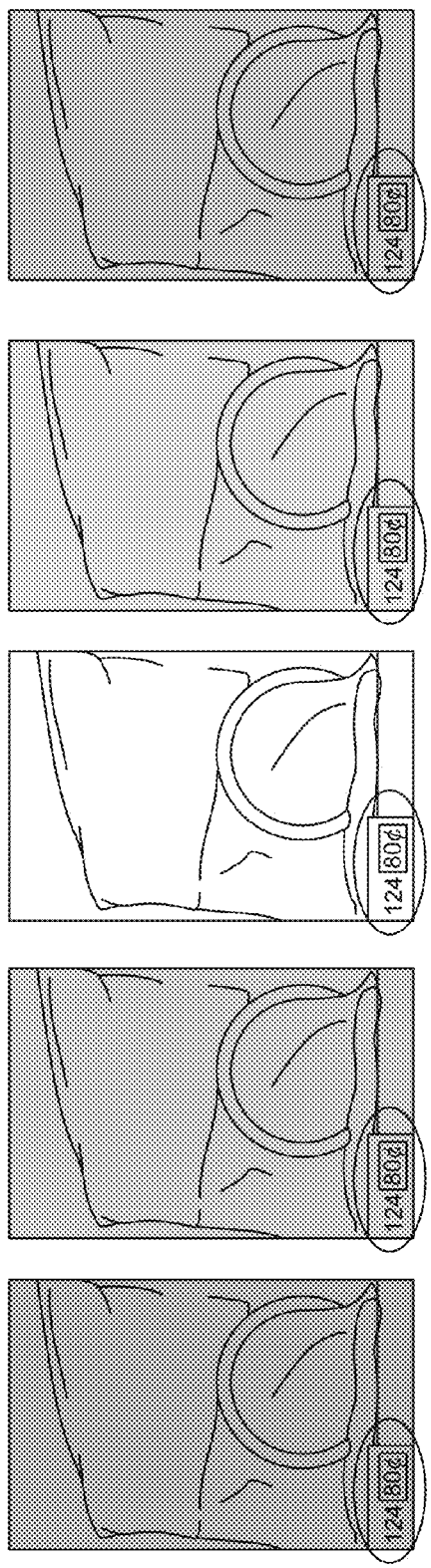
FIG. 9 illustrates another chromatic aberration and defocus example according to some embodiments.

FIG. 8 illustrates an example of chromatic aberration according to some embodiments. Lens chromatic aberration causes the sharpness of red and green channels to be different. The left-most image shows the object behind focus with a greenish edge. The right-most image shows the object in front of focus with a reddish edge. The middle image is in focus. FIG. 9 illustrates another chromatic aberration and defocus example according to some embodiments.

Focus detection using chromatic aberration includes computing the absolute difference between sharpness of green channel and red channel. This difference is able to be used to determine the focus. The smaller the difference (in terms of absolute values) indicates closer to focus.

Figure 10:
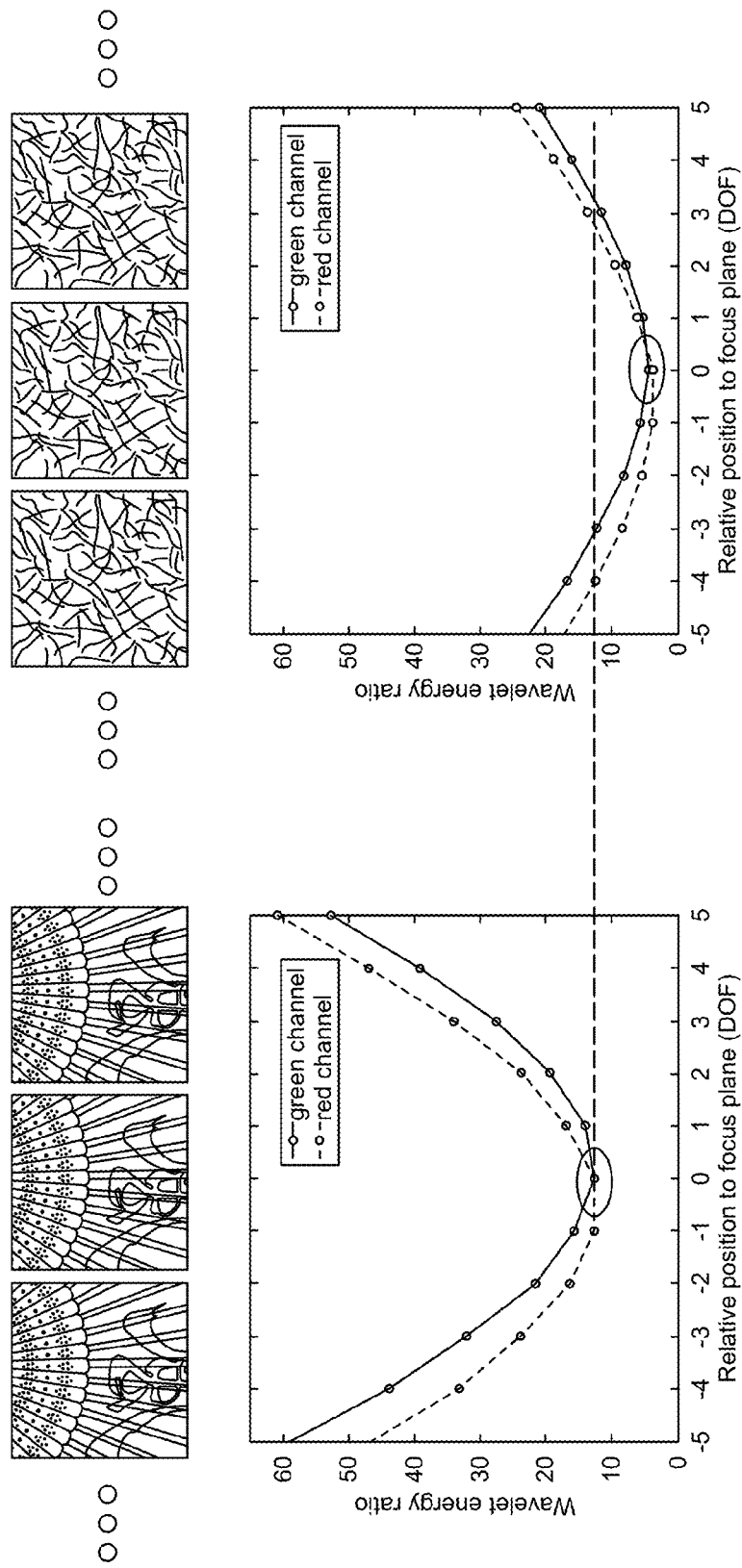
FIG. 10 illustrates an example of an application of the wavelet energy ratio with a red channel in the framework according to some embodiments.

FIG. 10 illustrates an example of an application of the wavelet energy ratio with a red channel in the framework according to some embodiments. The same wavelet energy ratio is considered in focus in one scene, and out of focus in another scene. The example illustrates the large variation of sharpness/blur metric with image content.

Figure 11:
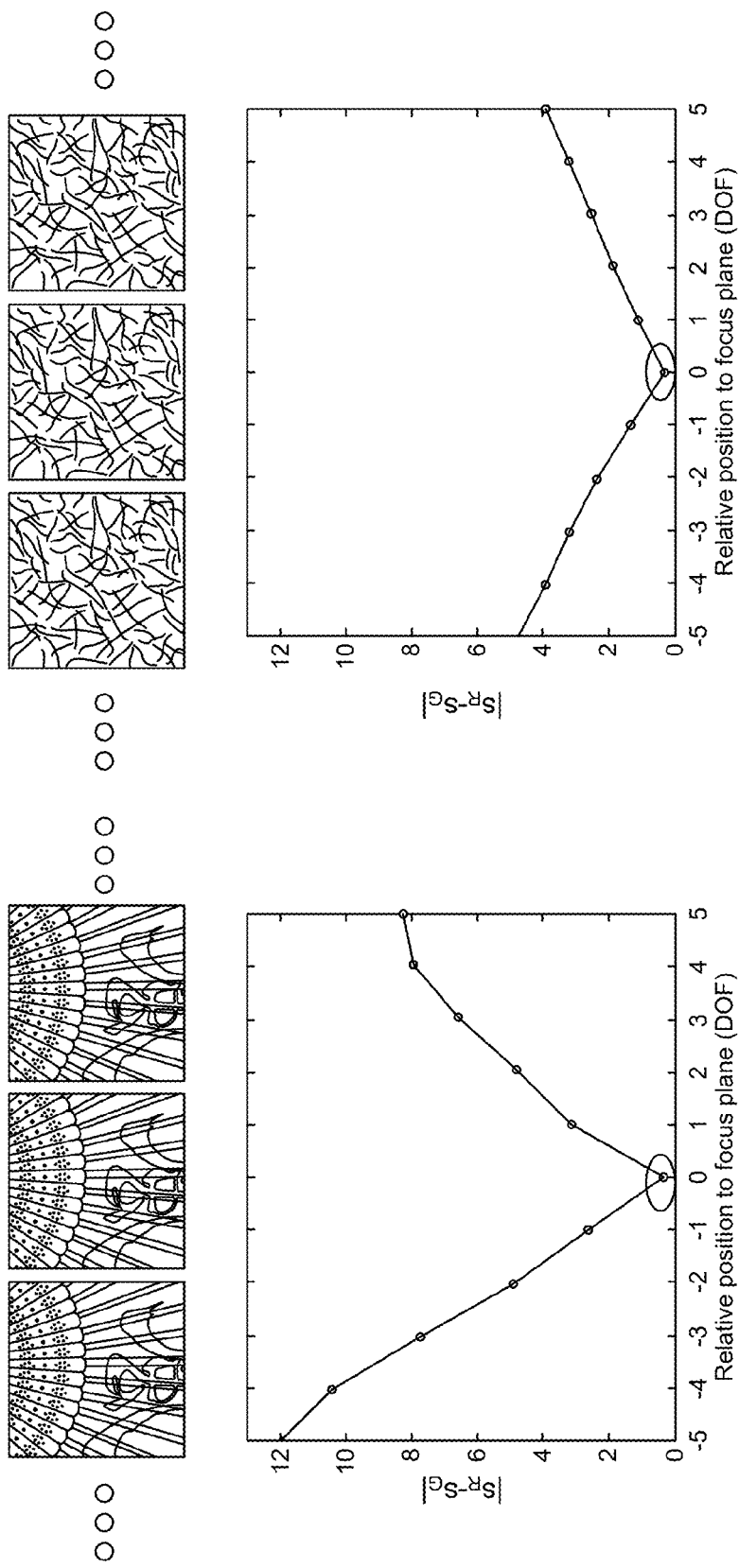
FIG. 11 illustrates an example of a difference of sharpness between red and green channels according to some embodiments.

FIG. 11 illustrates an example of a difference of sharpness between red and green channels according to some embodiments. Using the difference in sharpness as a focus measure significantly reduces scene variation.

Figure 12:
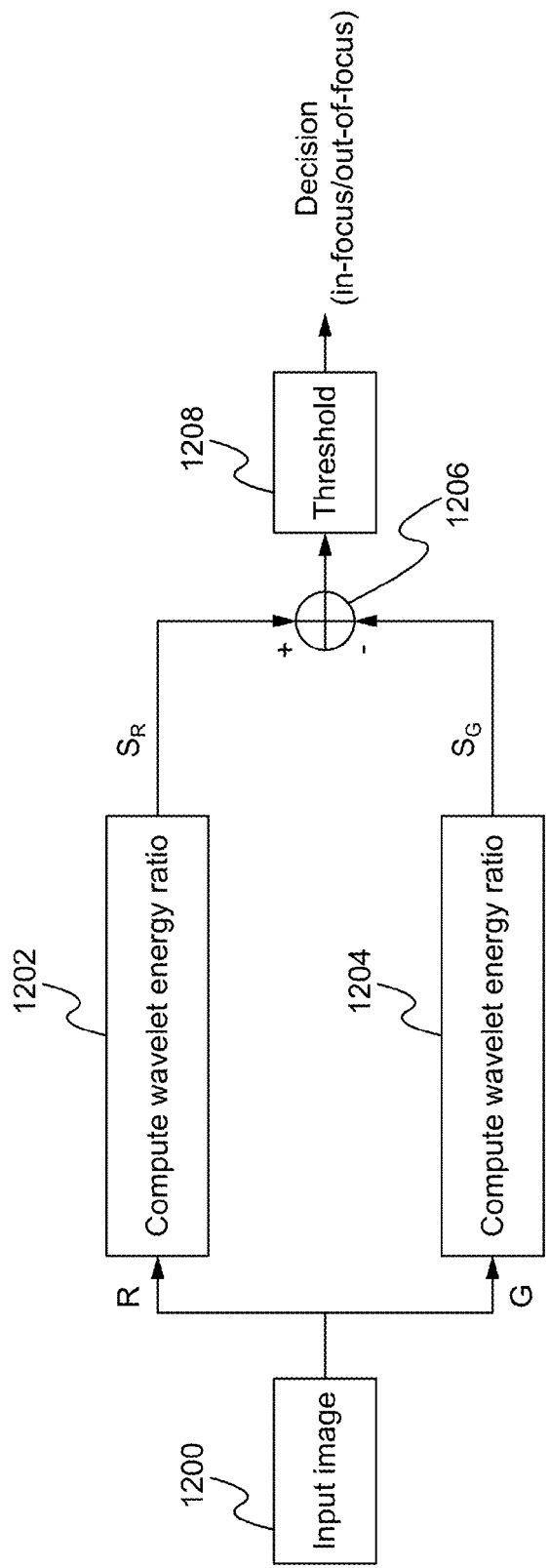
FIG. 12 illustrates a flowchart of a method of determining focus of a single image according to some embodiments.

FIG. 12 illustrates a flowchart of a method of determining focus of a single image according to some embodiments. In the step 1200, an image is acquired. In the step 1202, a wavelet energy ratio is computed for the red channel of the image. In the step 1204, a wavelet energy ratio is computed for the green channel of the image. In the step 1206, a difference of the wavelet energy ratios is computed. In the step 1208, the difference is compared with a threshold. If the difference is above the threshold, the image is out of focus and if the difference is at or below the threshold, then the image is in focus. The threshold is able to be any threshold, such as a threshold that is empirically determined or trained using machine learning for each different camera, lens, aperture and zoom setting. In addition, the gain factor (camera ISO) is able to be considered to adjust the threshold.

Focus Detection Using Power Spectrum

Figure 13:
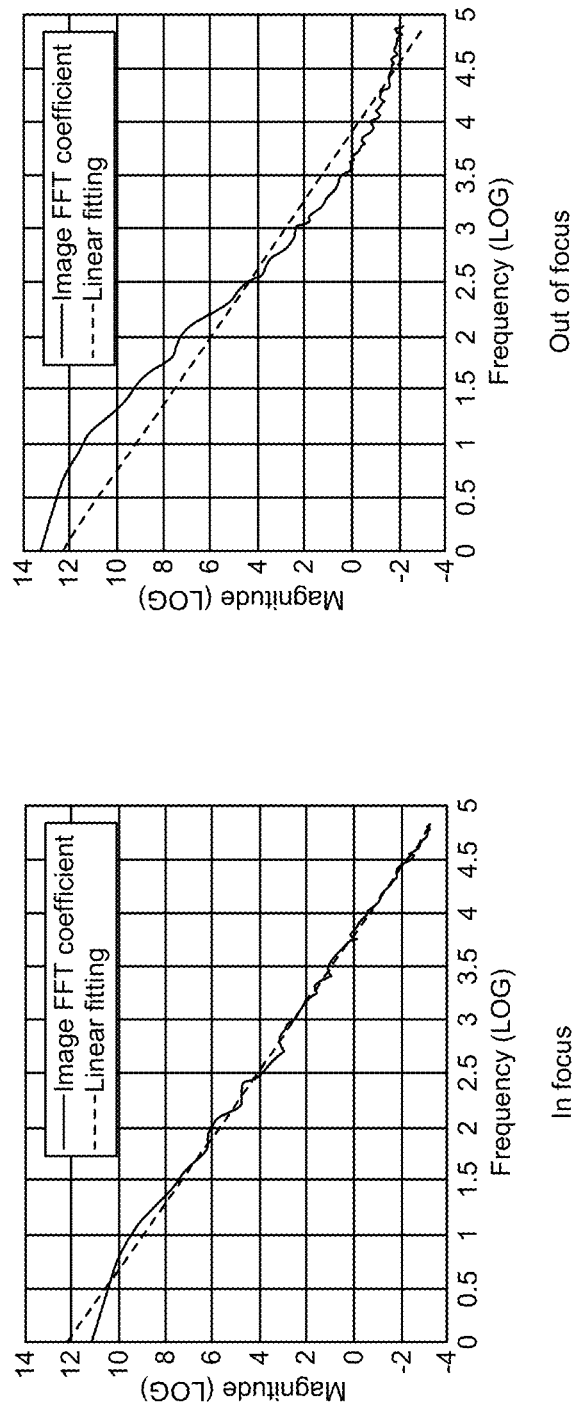
FIG. 13 illustrates graphs of in focus and out of focus images according to some embodiments.

Natural images are assumed to be made of fractals. The power spectrum of an image should fall off as $1/f^2$. FIG. 13 illustrates graphs of in focus and out of focus images according to some embodiments.

Figure 14:
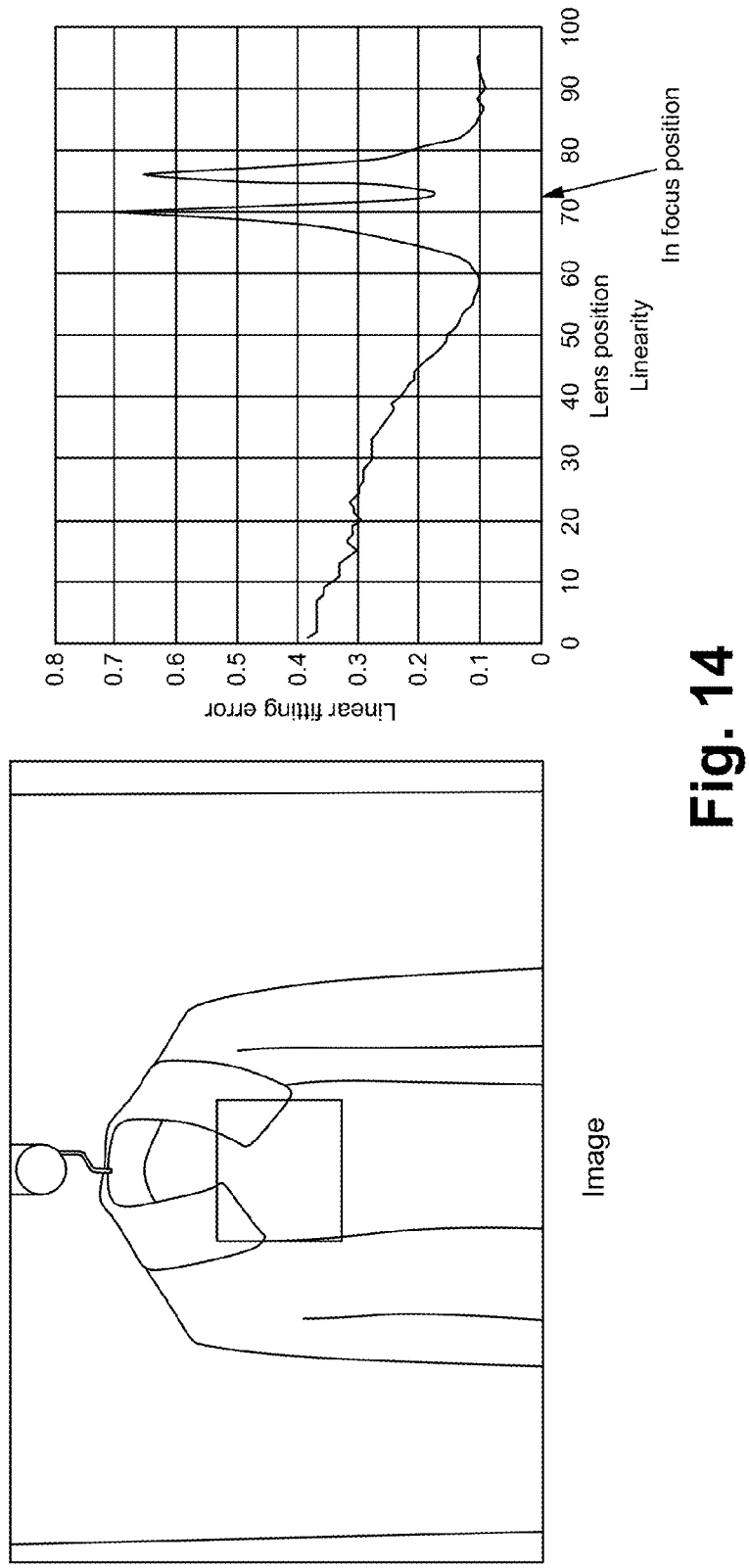
FIG. 14 illustrates an example of spectrum linearity according to some embodiments.

To perform focus detection using the power spectrum the following steps are implemented. A Fast Fourier Transform (FFT) is taken of the focus area. The radial average of the magnitude of the FFT coefficients around frequency 0 is taken. The logarithm of both magnitude and frequency is taken such that the curve should be linear if the image is in focus. A linear regression is taken. The error between the linear regression result and the FFT coefficient curve for measuring the linearity is calculated. Linear combination of the linearity error with the slope of the linear regression result is used for focus detection. FIG. 14 illustrates an example of spectrum linearity according to some embodiments.

In some embodiments, linearity error alone is not sufficient for focus detection. For some defocus images, the spectrum appears more linear than for the in focus image. The causes are able to be that blur is not Gaussian and there are strong periodic patterns in the image. To solve this issue, a modified focus detection function is used.

Figure 15:
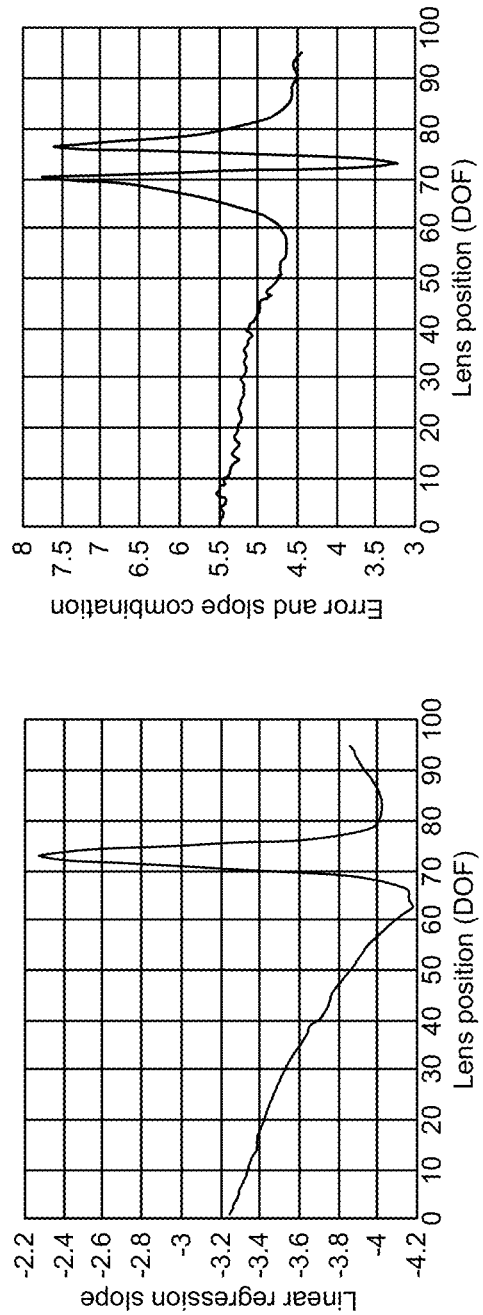
FIG. 15 illustrates graphs of a linear regression slope and a combination of spectrum linearity error and linear regression slope according to some embodiments.

Since the spectrum value falls off faster for a defocused image, the linear regression slope is able to be used for focus detection in combination with the spectrum linearity. The linear combination of spectrum linearity and linear regression slope is used as focus detection function. A large image data set that contains both in-focus and out-of-focus images is used to optimize the combination coefficients to maximally separate the in-focus images from the out-of-focus images. FIG. 15 illustrates graphs of a linear regression slope and a combination of spectrum linearity error and linear regression slope according to some embodiments.

A Coarse-to-Fine Depth Map Construction Method Using Chebyshev Moment

The method described herein targets constructing a depth map from a sequence of images taken from DSC cameras with different lens settings. At different lens positions, the scene being projected onto an image sensor presents a different extent of blurriness where only one lens position could correctly capture the scene with focus. Therefore, lens position is able to be used as a measurement of scene depth. To describe the depth information of complex scene, the image is able to be separated into small blocks and represent each block's depth by its focus lens position. A Chebyshev moment ratio is used as a focus measure to find the sharpest image among a sequence. The Chebyshev moment ratio measure mainly uses texture frequency information to find the focus image, so the curve will become noisy when the image patch lacks certain texture. To construct a high resolution yet smooth depth map, a coarse to fine scheme is developed, where a low resolution smooth depth map is constructed first and then refined to high resolution level by level. In the coarse level, block size is set large enough to contain certain texture to ensure the validity of Chebyshev moment ratio. However, the big block size loses accuracy if a single block contains multiple objects at a different depth as it will choose the dominant object's depth as a result. The big image block is continuously split into smaller blocks until the object in each block is of same depth. At a fine level, if the small patch contains few textures such that the focus measure becomes noisy, then the result is considered unreliable and result from coarser level is used.

A fundamental problem in image processing and computer vision is to retrieve the depth information of a complex scene. Camera autofocus is one such practical application.

Traditional contrast-based autofocus methods also try to find the sharpest image among a sequence of images with different blurring extent. Different focus measures including variance, first order gradient, second order gradient and frequency have been used. But these methods usually do not have reliability judgment that the result could become noisy when image contains few textures.

Described herein a reliability measure is used to decide whether the result of finding the sharpest image block is valid. Also, a coarse to fine scheme is used to ensure the smoothness if no reliable result is found.

A new reliability measure method includes checking the curve shape of Chebyshev moment ratio of a sequence of images. If the Chebyshev moment ratio curve has multiple local maximum values, and all the local maxima are large such that no one or two can stand out, then it is decided that the focused image found by comparing Chebyshev moment ratio is not reliable. If the Chebyshev moment ratio for an image patch is decided invalid, then the result from a lower level is used to replace the unreliable result. The coarse-to-fine level up refinement scheme first splits the image into large blocks (or do not split at all) to ensure that each block contains texture that Chebyshev moment ratio is valid, then each block is split into smaller blocks to update the depth value if result is valid. This scheme is able to successfully generate a high resolution depth map with less noise, as a big block in lower resolution depth map ensures smoothness while a small block in higher resolution increases accuracy.

The method is able to be used to construct a test bench reference depth map for various applications, such as 1-image or 2-image autofocus, 3D TV or any depth related computer vision tasks. It is also be applied as an autofocus technique.

A depth map is a way of expressing the depth information of a scene, where pixels in the depth map represent the objects' depth in 3D space. One way to measure scene depth is using lens position. Different lens positions focus at a different depth. The depth map is able to be of a different resolution. The finest resolution is the same resolution as the image. Coarser resolution means that a small image block is assumed to have the same depth, and pixels within that block in the depth map will be of the same value.

Figure 16:
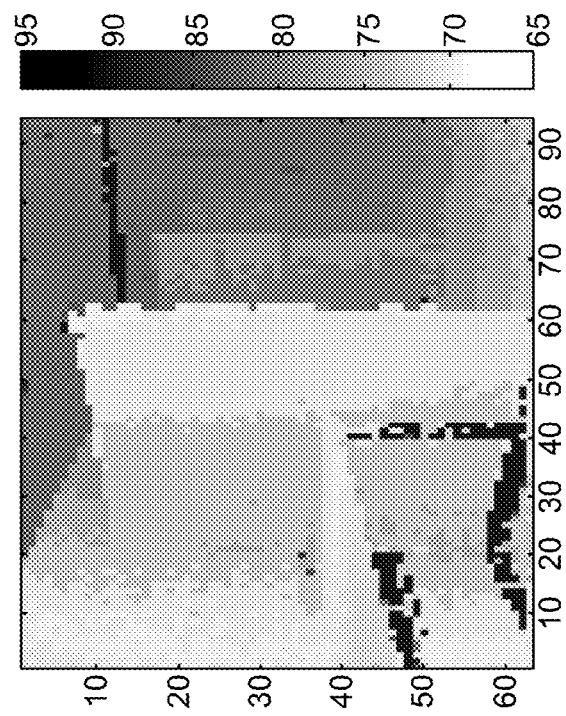
FIG. 16 illustrates an exemplary depth map according to some embodiments.
Figure 16:
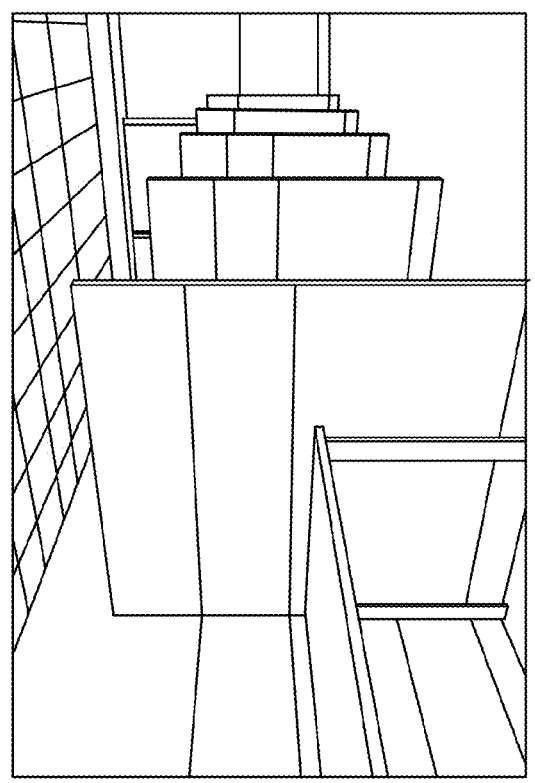
Figure 17:
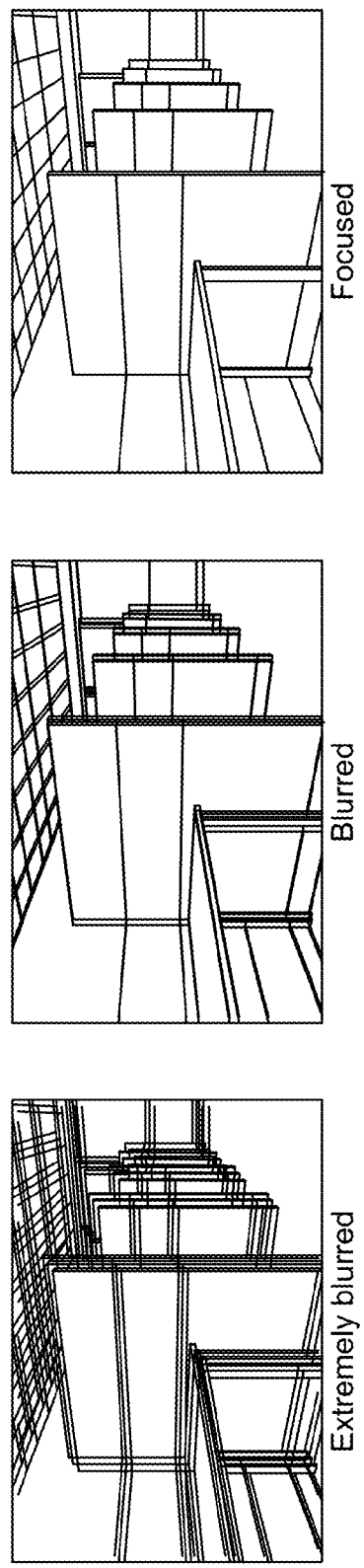
FIG. 17 illustrates examples of images with varying levels of blurriness according to some embodiments.
Figure 18:
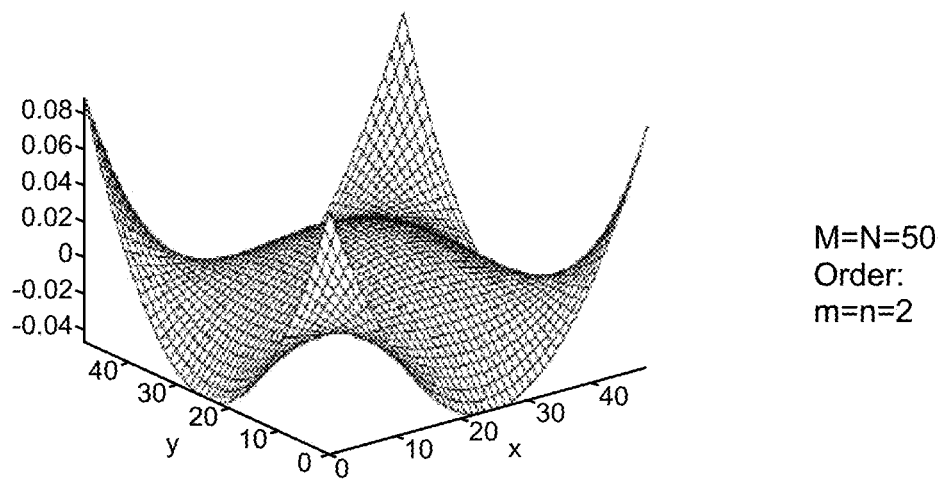
FIG. 18 illustrates a diagram of the Chebyshev moment ratio according to some embodiments.
Figure 18:
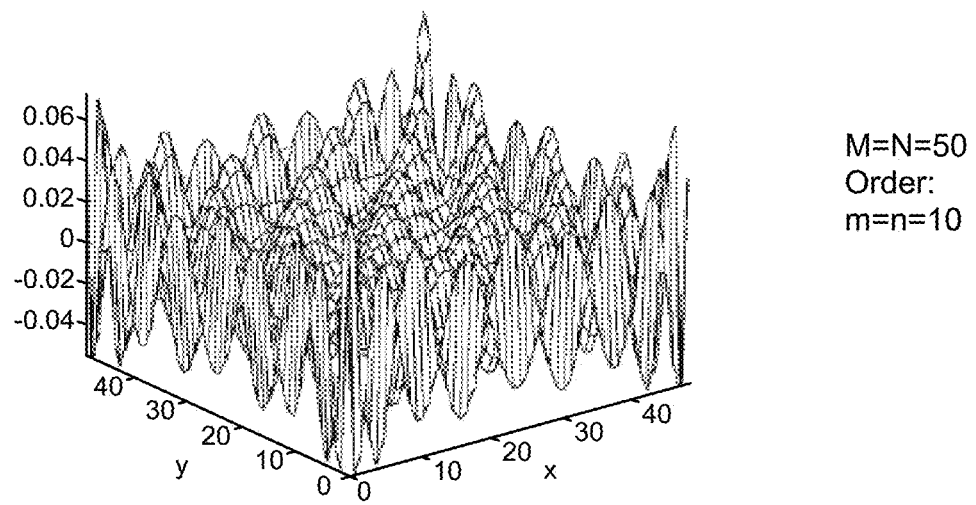

FIG. 16 illustrates an exemplary depth map according to some embodiments. FIG. 17 illustrates examples of images with varying levels of blurriness according to some embodiments. Images taken with different camera lens settings present different extent of blurriness. The sharpest image (focused image) is able to be determined by comparing the extent of blurriness which provides the depth. FIG. 18 illustrates a diagram of the Chebyshev moment ratio according to some embodiments.

The Chebyshev moment is a correlation measure between image and Chebyshev polynomials. The Chebyshev moment ratio is defined as high order moments divided by low order moments. Sharper images have larger Chebyshev moment ratios and blurred images have smaller Chebyshev moment ratios. From a sequence of images with different blur extent, the focus image is able to be found by comparing their Chebyshev moment ratios, where the image with the largest Chebyshev moment ratio is the focused image.

Figure 19:
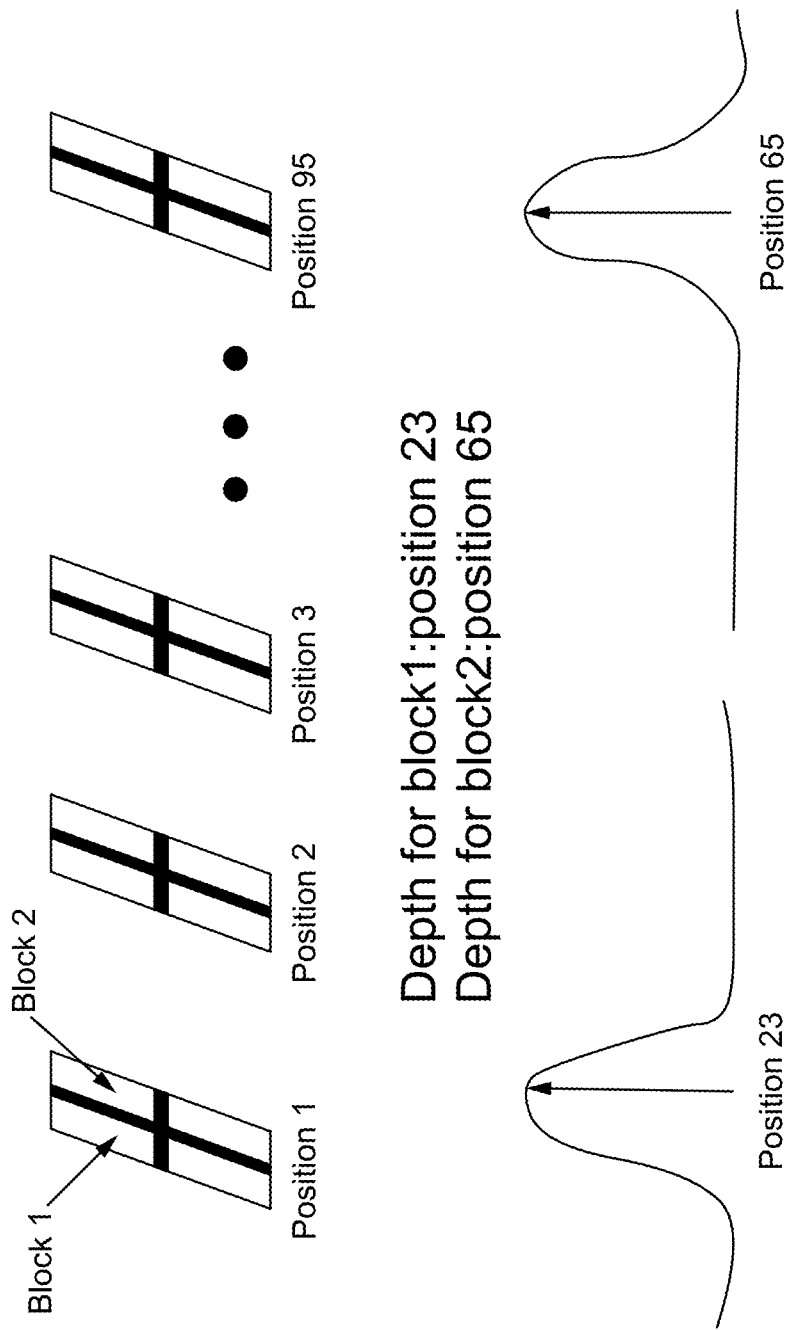
FIG. 19 illustrates a diagram of calculating the Chebyshev moment ratio according to some embodiments.

If the image contains multiple objects at different depths, then at a specific lens setting, only part of the image is able to be focused. To find the focus lens setting for the whole image, images are able to be split into small blocks and the suitable lens position for each block is found. The Chebyshev moment ratio is calculated for each small block and the block with maximal Chebyshev moment ratio is considered focused. FIG. 19 illustrates a diagram of calculating the Chebyshev moment ratio according to some embodiments.

Figure 20:
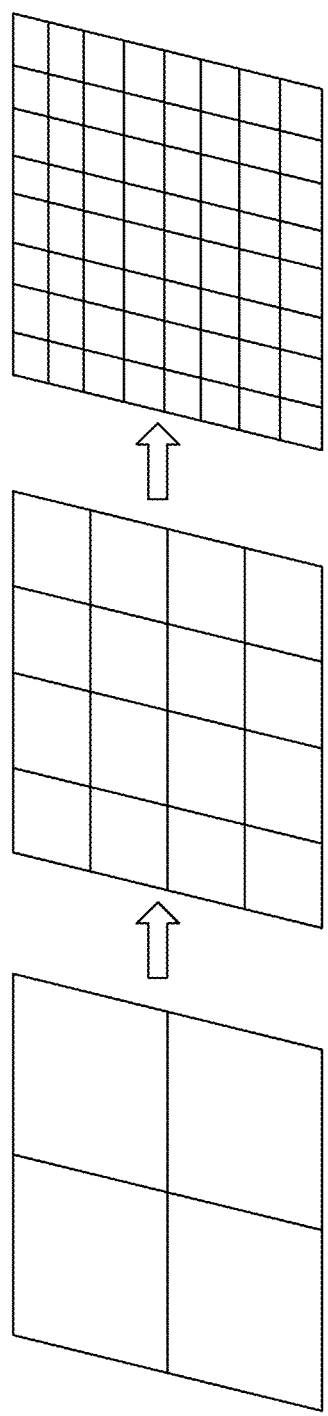
FIG. 20 illustrates a diagram of splitting blocks into smaller and smaller blocks according to some embodiments.

If an image block contains few textures, then the Chebyshev moment ratio curve is not smooth and may contain multiple local maxima, then the maximal value may not indicate the correct focus. So the image is split into bigger blocks to ensure every block contains texture, and then each bigger block is split into smaller blocks. FIG. 20 illustrates a diagram of splitting blocks into smaller and smaller blocks according to some embodiments.

Figure 21:
FIG. 21 illustrates an example of multiple depths according to some embodiments.
Figure 21:
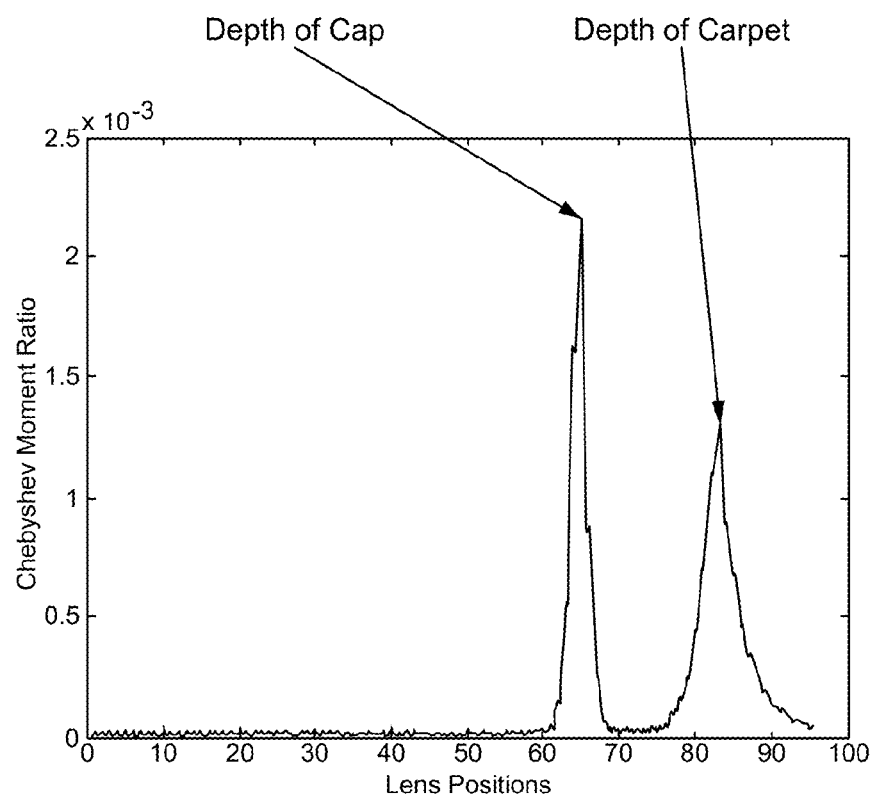

When a big block contains multiple objects at a different depth, the maximal Chebyshev moment ratio only corresponds to the dominant depth, to increase the depth map accuracy, the big block is split into smaller blocks. FIG. 21 illustrates an example of multiple depths according to some embodiments.

Figure 22:
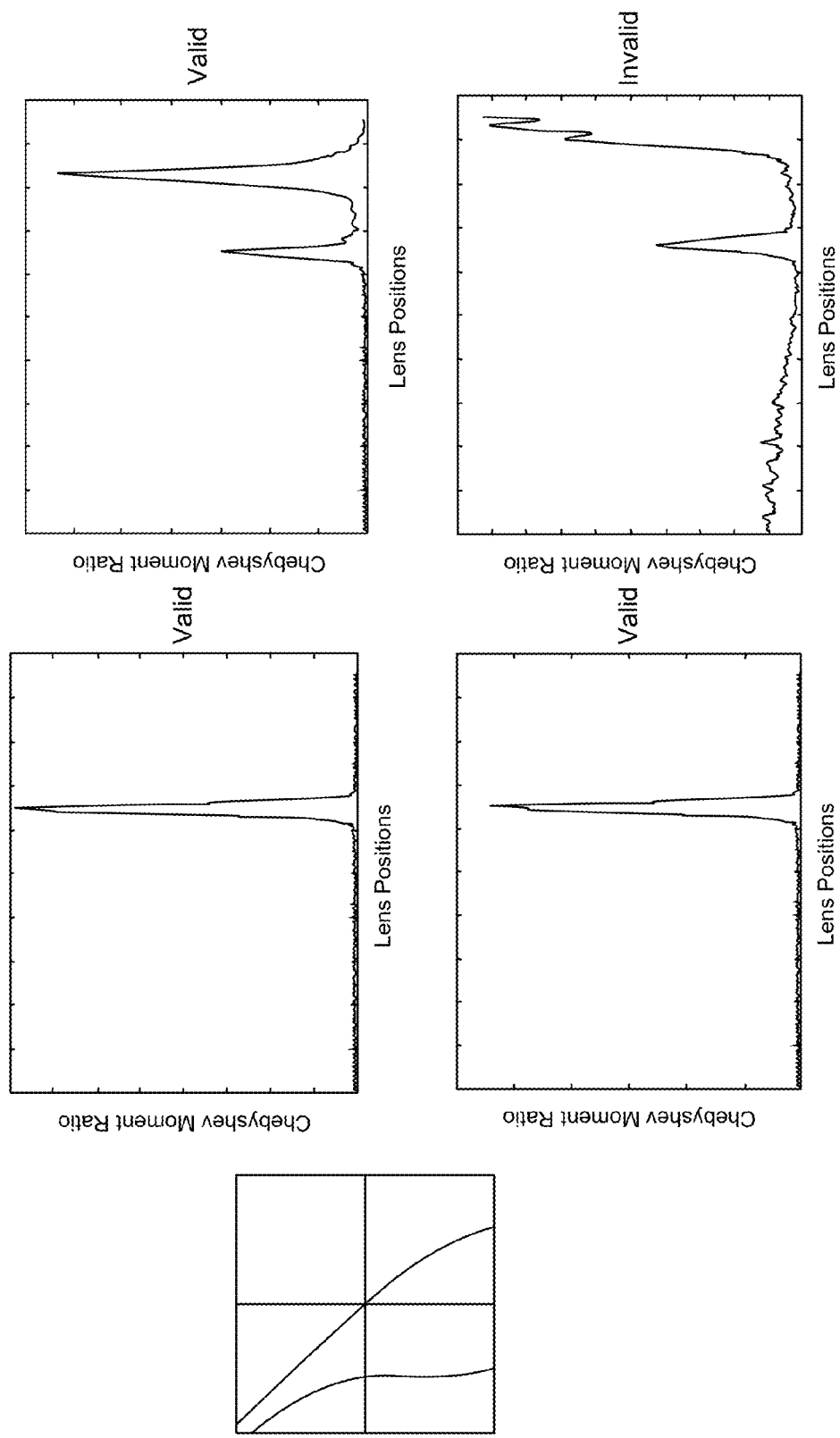
FIG. 22 illustrates graphs of Chebyshev moment ratios according to some embodiments.

FIG. 22 illustrates graphs of Chebyshev moment ratios according to some embodiments.

Figure 23:
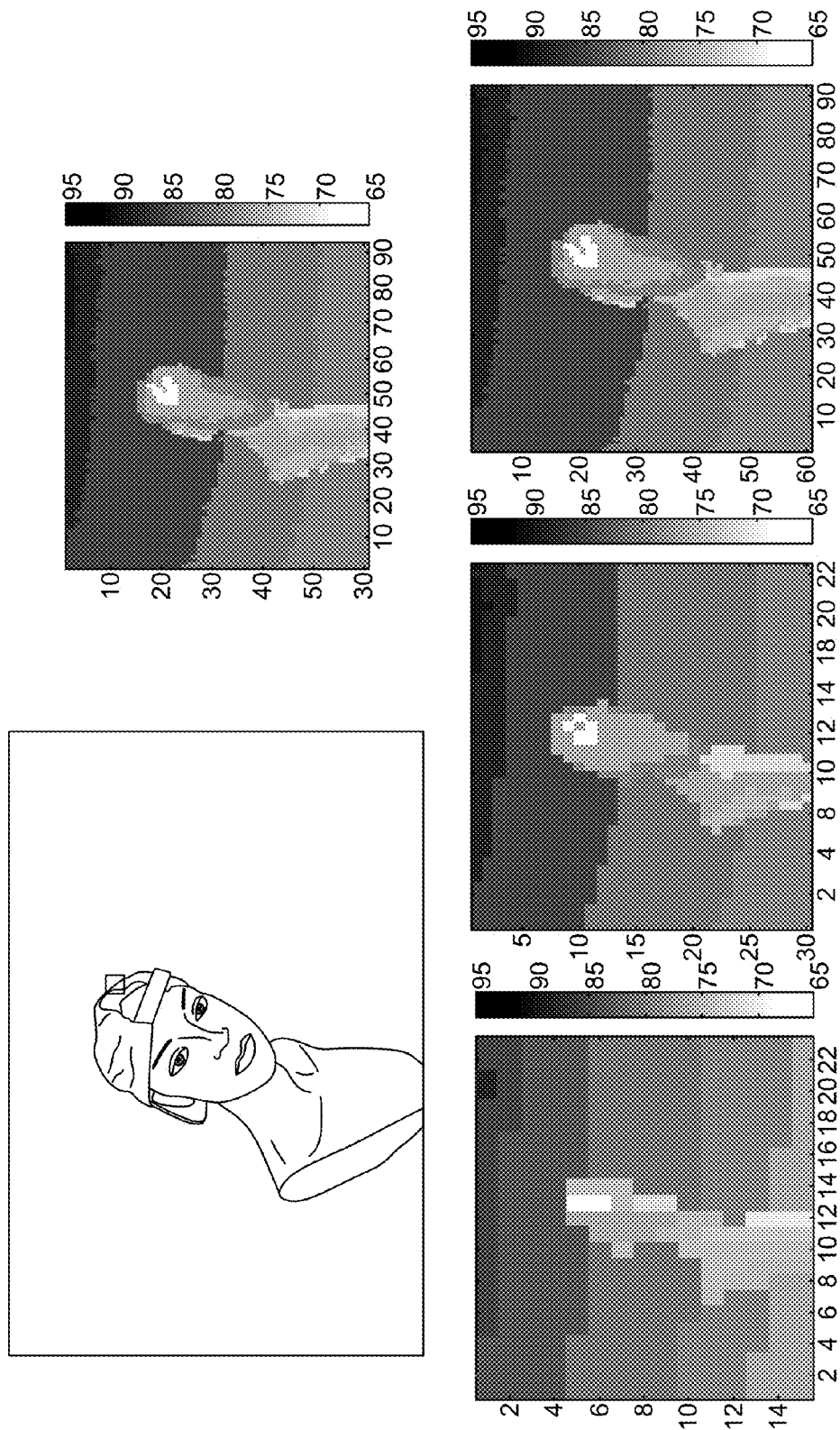
FIG. 23 illustrates diagrams of depth maps at varying levels according to some embodiments.
Figure 24:
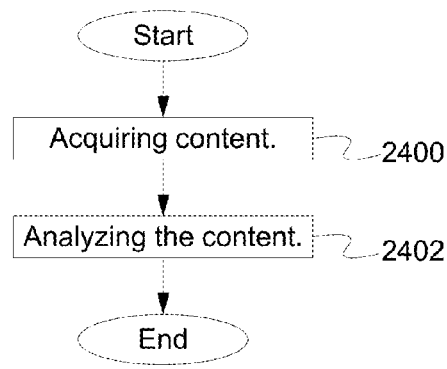
FIG. 24 illustrates a flowchart of a focus detection method according to some embodiments.

Sometimes due to lack of texture, the maximal Chebyshev moment ratio does not correspond to correct focus lens positions. Such results should be considered invalid. The judgment criteria includes: Chebyshev moment ratio curve should not contain more than three local maxima whose values are larger than 40% of the global maximal value. When the small block's chebyshev moment ratio curve is decided invalid, then the local maxima in the coarser level is used to replace it. If multiple local maxima exist, the one which is closer to the global maxima in the current level is chosen. FIG. 23 illustrates diagrams of depth maps at varying levels according to some embodiments FIG. 24 illustrates a flowchart of a focus detection method according to some embodiments. In the step 2400, content is acquired. For example, one or more images are captured. In the step 2402, the content is analyzed using the methods described herein. For example, iterative blur estimation, FFT linearity, edge percentage, wavelet energy ratio, improved wavelet energy ratio, Chebyshev moment ratio and chromatic aberration features are used in detecting focus. In some embodiments, fewer or additional steps are implemented. In some embodiments, the order of the steps is modified.

Figure 25:
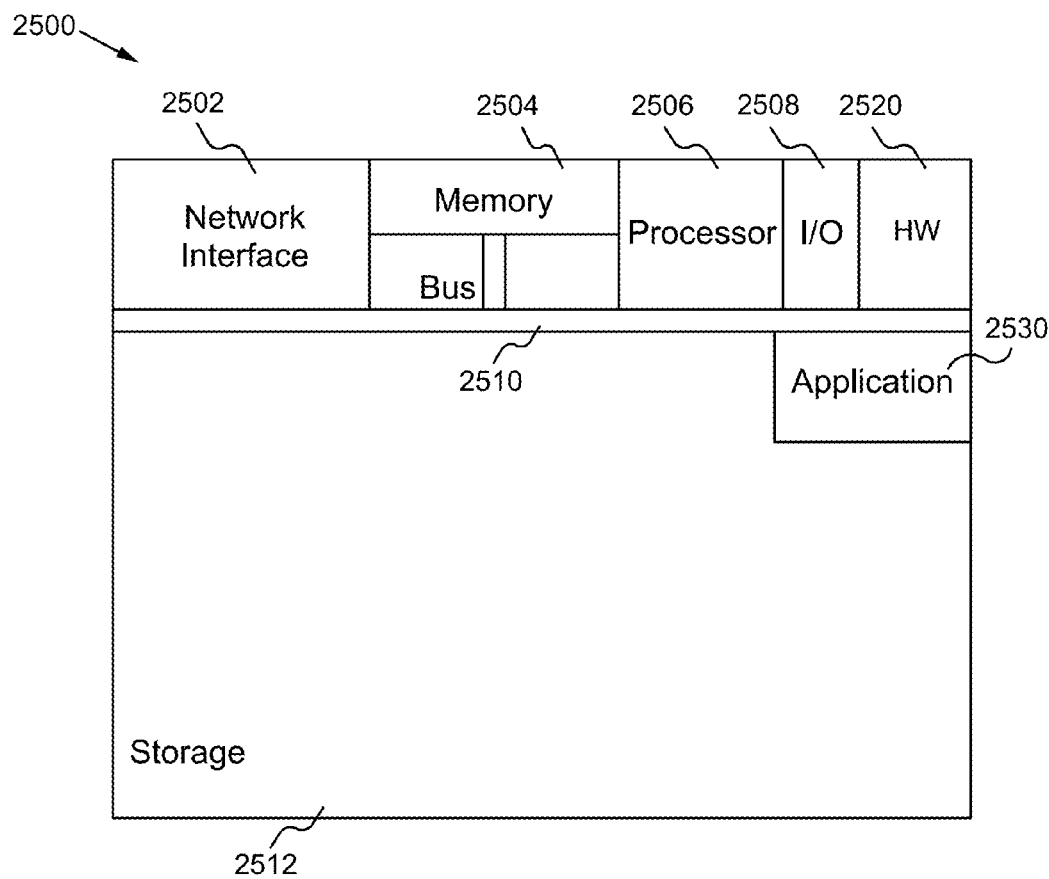
FIG. 25 illustrates a block diagram of an exemplary computing device configured to implement the focus detection methods according to some embodiments.

FIG. 25 illustrates a block diagram of an exemplary computing device configured to implement the focus detection methods according to some embodiments. The computing device 2500 is able to be used to acquire, store, compute, process, communicate and/or display information such as images and videos. In general, a hardware structure suitable for implementing the computing device 2500 includes a network interface 2502, a memory 2504, a processor 2506, I/O device(s) 2508, a bus 2510 and a storage device 2512. The choice of processor is not critical as long as a suitable processor with sufficient speed is chosen. The memory 2504 is able to be any conventional computer memory known in the art. The storage device 2512 is able to include a hard drive, CDROM, CDRW, DVD, DVDRW, High Definition disc/drive, ultra-HD drive, flash memory card or any other storage device. The computing device 2500 is able to include one or more network interfaces 2502. An example of a network interface includes a network card connected to an Ethernet or other type of LAN. The I/O device(s) 2508 are able to include one or more of the following: keyboard, mouse, monitor, screen, printer, modem, touchscreen, button interface and other devices. Focus detection application(s) 2530 used to perform the focus detection methods are likely to be stored in the storage device 2512 and memory 2504 and processed as applications are typically processed. More or fewer components shown in FIG. 25 are able to be included in the computing device 2500. In some embodiments, focus detection hardware 2520 is included. Although the computing device 2500 in FIG. 25 includes applications 2530 and hardware 2520 for the focus detection methods, the focus detection methods are able to be implemented on a computing device in hardware, firmware, software or any combination thereof. For example, in some embodiments, the focus detection applications 2530 are programmed in a memory and executed using a processor. In another example, in some embodiments, the focus detection hardware 2520 is programmed hardware logic including gates specifically designed to implement the focus detection methods.

In some embodiments, the focus detection methods application(s) 2530 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, smart jewelry (e.g., smart watch) or any other suitable computing device.

To utilize the focus detection methods described herein, a device such as a digital camera is used to acquire a video/image. The focus detection methods are automatically used for processing the acquired data, such as for autofocusing. The focus detection methods are able to be implemented automatically without user involvement.

In operation, the focus detection methods described herein significantly reduce the variation of focus measure for different scenes. The focus detection methods are able to be used with focus measure and auto focus applications on digital camera, camera phones, tablets, scanners, and any other optical imaging system with lenses.

Some Embodiments of Focus Detection

1. A method programmed in a non-transitory memory of a device comprising:
   a. acquiring content, wherein the content includes one or more images;
   b. determining if the content includes big blur images;
   c. removing the big blur images; and
   d. determining in-focus images of the remaining small blur images.
2. The method of clause 1 wherein the big blur images are far from the in-focus position such that the big blur images are at least 10 depth of field away.
3. The method of clause 1 wherein the big blur images are determined using criteria selected from iterative blur estimation, FFT linearity, edge percentage, wavelet energy ratio, improved wavelet energy ratio, Chebyshev moment ratio and chromatic aberration features.
4. The method of clause 1 wherein determining if the content includes the big blur images includes utilizing chromatic aberration features including computing a wavelet energy ratio for a first channel of the one or more images, computing a wavelet energy ratio for a second channel of the one or more images, computing a difference of wavelet energy ratios and comparing the difference with a threshold.
5. The method of clause 4 wherein if the difference is below the threshold, then the one or more images are in focus.
6. The method of clause 1 wherein determining if the content includes the big blur images includes computing a fast fourier transform of an area, computing a radial average of a magnitude of the fast fourier transform coefficients around frequency 0, computing a logarithm of magnitude and frequency, computing a linear regression, calculating an error between the linear regression result and the fast fourier transform coefficient curve for measuring linearity and combining the linearity error with a slope of the linear regression for focus detection.
7. The method of clause 1 wherein determining if the content includes the big blur images includes computing a Chebyshev moment ratio.
8. The method of clause 1 wherein determining the in-focus images of the remaining small blur images utilizes thresholds set for iteration number difference, combined chromatic features and combined non-chromatic features.
9. The method of clause 1 wherein the device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.
10. A system programmed in a non-transitory memory of a camera device comprising:
    a. a sensor configured for capturing content from a scene, wherein the content includes one or more images; and
    b. a computing module configured for:
       i. determining if the content includes big blur images;
       ii. removing the big blur images; and
       iii. determining in-focus images of the remaining small blur images.
11. The system of clause 10 wherein the big blur images are far from the in-focus position such that the big blur images are at least 10 depth of field away.
12. The system of clause 10 wherein the big blur images are determined using criteria selected from iterative blur estimation, FFT linearity, edge percentage, wavelet energy ratio, improved wavelet energy ratio, Chebyshev moment ratio and chromatic aberration features.

13. The system of clause 10 wherein determining if the content includes the big blur images includes utilizing chromatic aberration features including computing a wavelet energy ratio for a first channel of the one or more images, computing a wavelet energy ratio for a second channel of the one or more images, computing a difference of wavelet energy ratios and comparing the difference with a threshold.

14. The system of clause 13 wherein if the difference is below the threshold, then the one or more images are in focus.

15. The system of clause 10 wherein determining if the content includes the big blur images includes computing a fast fourier transform of an area, computing a radial average of a magnitude of the fast fourier transform coefficients around frequency 0, computing a logarithm of magnitude and frequency, computing a linear regression, calculating an error between the linear regression result and the fast fourier transform coefficient curve for measuring linearity and combining the linearity error with a slope of the linear regression for focus detection.

16. The system of clause 10 wherein determining if the content includes the big blur images includes computing a Chebyshev moment ratio.

17. The system of clause 10 wherein determining the in-focus images of the remaining small blur images utilizes thresholds set for iteration number difference, combined chromatic features and combined non-chromatic features.

18. A camera device comprising:
    a. a sensor for capturing content from a scene, wherein the content includes one or more images; and
    b. a memory for storing an application, the application for:
        i. determining if the content includes big blur images;
        ii. removing the big blur images; and
        iii. determining in-focus images of the remaining small blur images; and
    c. a processor for processing the application.

19. The camera device of clause 18 wherein the big blur images are far from the in-focus position such that the big blur images are at least 10 depth of field away.

20. The camera device of clause 18 wherein the big blur images are determined using criteria selected from iterative blur estimation, FFT linearity, edge percentage, wavelet energy ratio, improved wavelet energy ratio, Chebyshev moment ratio and chromatic aberration features.

21. The camera device of clause 18 wherein determining if the content includes the big blur images includes utilizing chromatic aberration features including computing a wavelet energy ratio for a first channel of the one or more images, computing a wavelet energy ratio for a second channel of the one or more images, computing a difference of wavelet energy ratios and comparing the difference with a threshold.

22. The camera device of clause 21 wherein if the difference is below the threshold, then the one or more images are in focus.

23. The camera device of clause 18 wherein determining if the content includes the big blur images includes computing a fast fourier transform of an area, computing a radial average of a magnitude of the fast fourier transform coefficients around frequency 0, computing a logarithm of magnitude and frequency, computing a linear regression, calculating an error between the linear regression result and the fast fourier transform coefficient curve for measuring linearity and combining the linearity error with a slope of the linear regression for focus detection.

24. The camera device of clause 18 wherein determining if the content includes the big blur images includes computing a Chebyshev moment ratio.

25. The camera device of clause 18 wherein determining the in-focus images of the remaining small blur images utilizes thresholds set for iteration number difference, combined chromatic features and combined non-chromatic features.

26. A method programmed in a non-transitory memory of a device comprising:
    a. acquiring a sequence of images using the device; and
    b. generating a depth map using the sequence of images using a Chebyshev moment ratio.

27. The method of clause 26 wherein each image of the sequence of images is taken with a different lens setting.

28. The method of clause 26 wherein each image of the sequence of images is separated into small blocks and represent each block's depth by focus lens position.

29. The method of clause 26 wherein the Chebyshev moment ratio is used as a focus measure to find a sharpest image among the sequence of images.

30. The method of clause 29 wherein generating the depth map includes generating a low resolution smooth depth map first, and then refining the low resolution smooth depth map to a high resolution depth map level by level, wherein in a coarse level, a block size is large enough to contain texture to ensure validity of the Chebyshev moment ratio, and a big image block is continuously split into smaller blocks until an object in each block is of a same depth.

31. The method of clause 30 further comprising checking a curve shape of the Chebyshev moment ratio of the sequence of images, and if the Chebyshev moment ratio curve has multiple local maximum values, and all local maxima are large such that none stand out, then determining that a focused image found by comparing the Chebyshev moment ratio is not reliable, and if the Chebyshev moment ratio for an image patch is decided invalid, then a result from a lower level is used to replace the unreliable result.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
    a. acquiring content, wherein the content includes one or more images, wherein the content includes at least one small blur image;
    b. determining if the content includes one or more big blur images;
    c. removing the one or more big blur images, when the one or more big blur images are determined; and
    d. determining in-focus images of small blur images without the one or more big blur images, wherein determining the in-focus images of the small blur images utilizes thresholds set for iteration number difference, combined chromatic features and combined non-chromatic features.

2. The method of claim 1 wherein the one or more big blur images are far from an in-focus position such that the one or more big blur images are at least 10 depth of field away.

3. The method of claim 1 wherein the one or more big blur images are determined using criteria selected from iterative blur estimation, FFT linearity, edge percentage, wavelet energy ratio, improved wavelet energy ratio, Chebyshev moment ratio and chromatic aberration features.

4. The method of claim 1 wherein determining if the content includes the one or more big blur images includes utilizing chromatic aberration features including computing a wavelet energy ratio for a first channel of the one or more images, computing a wavelet energy ratio for a second channel of the one or more images, computing a difference of the wavelet energy ratio for the first channel and the wavelet energy ratio of the second channel and comparing the difference with a threshold.

5. The method of claim 4 wherein if the difference is below the threshold, then the one or more images are in focus.

6. The method of claim 1 wherein determining if the content includes the one or more big blur images includes computing a fast fourier transform of an area, computing a radial average of a magnitude of the fast fourier transform coefficients around frequency 0, computing a logarithm of magnitude and frequency, computing a linear regression, calculating an error between the linear regression result and a fast fourier transform coefficient curve for measuring linearity and combining a linearity error with a slope of the linear regression for focus detection.

7. The method of claim 1 wherein determining if the content includes the one or more big blur images includes computing a Chebyshev moment ratio.

8. The method of claim 1 wherein the device is selected from the group consisting of a personal computer, a laptop computer, a computer workstation, a server, a mainframe computer, a handheld computer, a personal digital assistant, a cellular/mobile telephone, a smart phone, a smart appliance, a gaming console, a digital camera, a digital camcorder, a camera phone, an portable music player, a tablet computer, a video player, a DVD writer/player, a high definition video writer/player, a television and a home entertainment system.

9. A system comprising:
a. a sensor configured for capturing content from a scene, wherein the content includes one or more images, wherein the content includes at least one small blur image; and
b. a computing module configured for:
  i. determining if the content includes one or more big blur images;
  ii. removing the one or more big blur images, when the one or more big blur images are determined; and
  iii. determining in-focus images of small blur images without the one or more big blur images, wherein determining the in-focus images of the small blur images utilizes thresholds set for iteration number difference, combined chromatic features and combined non-chromatic features.

10. The system of claim 9 wherein the one or more big blur images are far from an in-focus position such that the one or more big blur images are at least 10 depth of field away.

11. The system of claim 9 wherein the one or more big blur images are determined using criteria selected from iterative blur estimation, FFT linearity, edge percentage, wavelet energy ratio, improved wavelet energy ratio, Chebyshev moment ratio and chromatic aberration features.

12. The system of claim 9 wherein determining if the content includes the one or more big blur images includes utilizing chromatic aberration features including computing a wavelet energy ratio for a first channel of the one or more images, computing a wavelet energy ratio for a second channel of the one or more images, computing a difference of the wavelet energy ratio for the first channel and the wavelet energy ratio of the second channel and comparing the difference with a threshold.

13. The system of claim 12 wherein if the difference is below the threshold, then the one or more images are in focus.

14. The system of claim 9 wherein determining if the content includes the one or more big blur images includes computing a fast fourier transform of an area, computing a radial average of a magnitude of the fast fourier transform coefficients around frequency 0, computing a logarithm of magnitude and frequency, computing a linear regression, calculating an error between the linear regression result and a fast fourier transform coefficient curve for measuring linearity and combining a linearity error with a slope of the linear regression for focus detection.

15. The system of claim 9 wherein determining if the content includes the one or more big blur images includes computing a Chebyshev moment ratio.

16. A camera device comprising:
a. a sensor for capturing content from a scene, wherein the content includes one or more images, wherein the content includes at least one small blur image; and
b. a memory for storing an application, the application for:
  i. determining if the content includes one or more big blur images;
  ii. removing the one or more big blur images, when the one or more big blur images are determined; and
  iii. determining in-focus images of small blur images without the one or more big blur images, wherein determining the in-focus images of the small blur images utilizes thresholds set for iteration number difference, combined chromatic features and combined non-chromatic features; and
c. a processor for processing the application.

17. The camera device of claim 16 wherein the one or more big blur images are far from an in-focus position such that the one or more big blur images are at least 10 depth of field away.

18. The camera device of claim 16 wherein the one or more big blur images are determined using criteria selected from iterative blur estimation, FFT linearity, edge percentage, wavelet energy ratio, improved wavelet energy ratio, Chebyshev moment ratio and chromatic aberration features.

19. The camera device of claim 16 wherein determining if the content includes the one or more big blur images includes utilizing chromatic aberration features including computing a wavelet energy ratio for a first channel of the one or more images, computing a wavelet energy ratio for a second channel of the one or more images, computing a difference of the wavelet energy ratio for the first channel and the wavelet energy ratio of the second channel and comparing the difference with a threshold.

20. The camera device of claim 19 wherein if the difference is below the threshold, then the one or more images are in focus.

21. The camera device of claim 16 wherein determining if the content includes the one or more big blur images includes computing a fast fourier transform of an area, computing a radial average of a magnitude of the fast fourier transform coefficients around frequency 0, computing a logarithm of magnitude and frequency, computing a linear regression, calculating an error between the linear regression result and a fast fourier transform coefficient curve for measuring linearity and combining linearity error with a slope of the linear regression for focus detection.

22. The camera device of claim 16 wherein determining if the content includes the one or more big blur images includes computing a Chebyshev moment ratio.

* * * * *